US012098906B2

(12) United States Patent
Böhringer et al.

(10) Patent No.: US 12,098,906 B2
(45) Date of Patent: *Sep. 24, 2024

(54) PROTECTIVE CLOTHING UNIT HAVING PREFERABLY TEXTILE FRAGMENT PROTECTION EQUIPMENT

(71) Applicant: Blücher GmbH, Erkrath (DE)

(72) Inventors: Bertram Böhringer, Wuppertal (DE); Katrin Freier, Mönchengladbach (DE)

(73) Assignee: BLUCHER GMBH (DE)

( * ) Notice: Subject to any disclaimer, the term of this patent is extended or adjusted under 35 U.S.C. 154(b) by 594 days.

This patent is subject to a terminal disclaimer.

(21) Appl. No.: 15/324,333

(22) PCT Filed: Apr. 17, 2015

(86) PCT No.: PCT/EP2015/058379

§ 371 (c)(1),
(2) Date: Jan. 6, 2017

(87) PCT Pub. No.: WO2016/005066

PCT Pub. Date: Jan. 14, 2016

(65) Prior Publication Data

US 2017/0176146 A1 Jun. 22, 2017

(30) Foreign Application Priority Data

Jul. 11, 2014 (DE) ..................... 10 2014 010 246.7
Jul. 14, 2014 (DE) ..................... 10 2014 010 321.8
Jul. 30, 2014 (DE) ..................... 10 2014 110 791.8

(51) Int. Cl.
*F41H 1/02* (2006.01)
*A41B 9/06* (2006.01)
(Continued)

(52) U.S. Cl.
CPC ................ *F41H 1/02* (2013.01); *A41B 9/06* (2013.01); *A41B 9/12* (2013.01); *A41D 1/06* (2013.01);
(Continued)

(58) Field of Classification Search
CPC .. F41H 1/02; F41H 5/04; F41H 5/0471–0485; F41H 1/04; A62B 17/003;
(Continued)

(56) References Cited

U.S. PATENT DOCUMENTS 2,879,654 A * 3/1959 Evans ...................... F41H 1/02 66/176
3,221,522 A 12/1965 Nebel
(Continued)

FOREIGN PATENT DOCUMENTS

DE 20314504 1/2004
DE 202010000598 6/2010
(Continued)

OTHER PUBLICATIONS

Spencer, David J . . . (2001). Knitting Technology13 A Comprehensive Handbook and Practical Guide (3rd Edition)—13 Circular Fabric Knitting. Woodhead Publishing. Retrieved from https://app.knovel.com/hotlink/pdf/id:kt003HYSR4/knitting-technology-comprehensive/non-jacquard-double-jersey (Year: 2001).*
(Continued)

*Primary Examiner* — Larissa Rowe Emrich
(74) *Attorney, Agent, or Firm* — Edward E. Sowers; Brannon Sowers & Cracraft PC

(57) ABSTRACT

The invention relates to a protective clothing unit, in particular a protective clothing unit having fragment protection, preferably having a protective function against fragments created and/or released by detonation and/or explosion, comprising outerwear and/or underwear and possibly com-
(Continued)

prising separate head and/or face protection, neck protection, shoulder protection, arm protection, hand protection, trunk protection, torso protection, genital and/or anal protection, and/or leg protection, wherein the protective clothing unit has fragment protection elements, preferably textile fragment protection elements, which are specific and different from each other and which are associated with different body regions when worn and/or cover different body regions when worn, preferably having a protective function against fragments created and/or released by detonation and/or explosion.

16 Claims, 9 Drawing Sheets

(51) Int. Cl.

| | |
|---|---|
| ***A41B 9/12*** | (2006.01) |
| ***A41D 1/06*** | (2006.01) |
| ***A41D 3/00*** | (2006.01) |
| ***A41D 13/02*** | (2006.01) |
| ***A41D 13/11*** | (2006.01) |
| ***A41D 19/015*** | (2006.01) |
| ***A62B 17/00*** | (2006.01) |
| ***D04B 1/10*** | (2006.01) |
| ***D04B 1/12*** | (2006.01) |
| ***D04B 1/24*** | (2006.01) |
| ***F41H 5/04*** | (2006.01) |

(52) U.S. Cl.
CPC ............... *A41D 3/00* (2013.01); *A41D 13/02* (2013.01); *A41D 13/11* (2013.01); *A41D 19/01505* (2013.01); *A62B 17/003* (2013.01); *A62B 17/006* (2013.01); *D04B 1/102* (2013.01); *D04B 1/12* (2013.01); *D04B 1/243* (2013.01); *D04B 1/246* (2013.01); *F41H 5/0478* (2013.01); *F41H 5/0485* (2013.01); *D10B 2321/0211* (2013.01)

(58) Field of Classification Search
CPC ....................... A62B 17/006; A41D 19/01505; A41D 13/11; A41D 31/24–245; A41B 9/12; D04B 1/06–08; D04B 1/16; D04B 1/102; D04B 1/12; D04B 1/246; D04B 1/243; B32B 2571/02; D10B 2321/0211; D02G 3/26–30; D03D 1/0052
USPC ................................ 2/2.5; 428/911; 442/313
See application file for complete search history.

(56) References Cited

U.S. PATENT DOCUMENTS

| | | | | |
|---|---|---|---|---|
| 4,451,934 A * | 6/1984 | Gioello | .................... A41B 9/00 | 2/113 |
| 5,316,820 A * | 5/1994 | Harpell | ..................... B32B 3/16 | 428/109 |
| 6,103,641 A * | 8/2000 | Gehring, Jr. | .............. B32B 5/26 | 442/46 |
| 7,434,423 B1 * | 10/2008 | Reid, Jr. | ................. A61F 13/08 | 66/178 A |
| 2008/0139071 A1 | 6/2008 | Bhatnagar | | |
| 2009/0320172 A1 | 12/2009 | Slate et al. | | |
| 2010/0154621 A1 * | 6/2010 | Nilakantan | .......... D03D 1/0052 | 89/36.02 |
| 2010/0275341 A1 | 11/2010 | Sweeney et al. | | |
| 2012/0060681 A1 | 3/2012 | Hoenes | | |
| 2012/0117700 A1 * | 5/2012 | Howell | ..................... F41H 1/02 | 2/2.5 |
| 2012/0128947 A1 * | 5/2012 | Bohringer | ............ A62B 17/006 | 428/198 |
| 2012/0278981 A1 | 11/2012 | Ialenti | | |
| 2013/0213208 A1 * | 8/2013 | Compton | .............. F41H 5/0478 | 89/36.02 |
| 2014/0033388 A1 | 2/2014 | Sonner et al. | | |
| 2014/0331375 A1 * | 11/2014 | Howland | ................. A41D 1/02 | 2/2.5 |
| 2015/0013039 A1 * | 1/2015 | Parker | ....................... F41H 1/02 | 2/2.5 |
| 2016/0017521 A1 * | 1/2016 | Thomson | ............... D03D 15/08 | 66/171 |

FOREIGN PATENT DOCUMENTS

| | | | |
|---|---|---|---|
| DE | 112010005258 | 5/2013 | |
| DE | 102012110104 | 6/2014 | |
| GB | 2487966 | 8/2012 | |
| GB | 2500117 | 11/2013 | |
| WO | 2005066401 | 7/2005 | |
| WO | 2010104943 | 9/2010 | |
| WO | 2013087827 | 6/2013 | |
| WO | WO-2013087827 A1 * | 6/2013 | ............. B32B 27/12 |
| WO | 2014060094 | 4/2014 | |

OTHER PUBLICATIONS

Vlasblom, M.P.,and J.L.J. Van Dingenen. "13—The Manufacture, Properties and Applications of High Strength, High Modulus Polyethylene Fibers." Handbook of Tensile Properties of Textile and Technical Fibers, Woodhead Publishing, 2009, pp. 437-485. Available at https://doi.org/10.1533/9781845696801.2.437 (Year: 2009).*
"Jersey." Complete Textile Glossary. New York, NY: Celanese Acetate, 2001. N. pag. Print. (Year: 2001).*
Scott, Richard A . . . (2005). Textiles for Protection—19. Ballistic Protection. Woodhead Publishing. Retrieved from https://app.knovel.com/hotlink/pdf/id:kt003W3XX1/textiles-protection/ballistic-protection (Year: 2005).*
Spencer, David J . . . (2001). Knitting Technology—A Comprehensive Handbook and Practical Guide (3rd Edition)—22.6 Tightness Factor. Woodhead Publishing. Retrieved from https://app.knovel.com/hotlink/pdf/id:kt003HYVP3/knitting-technology-comprehensive/tightness-factor (Year: 2001).*
Vlasblom, M.P. "13—The Manufacture, Properties and Applications of High Strength, High Modulus Polyethylene Fibers." Handbook ofTensile Properties ofTextile and Technical Fibers.Woodhead Publishing, 2009, pp. 437-485. Available at https://doi .org/10.1533/9781845696801.2.437 (Year: 2009).

* cited by examiner

PROTECTIVE CLOTHING UNIT HAVING PREFERABLY TEXTILE FRAGMENT PROTECTION EQUIPMENT

CROSS-REFERENCES TO RELATED APPLICATIONS

This application is a National Stage filing of International Application PCT/EP 2015/058379, filed Apr. 17, 2015, entitled PROTECTIVE CLOTHING UNIT HAVING PREFERABLY TEXTILE FRAGMENT PROTECTION EQUIPMENT, claiming priority to German Application Nos. DE 10 2014 010 246.7 filed Jul. 11, 2014; DE 10 2014 010 321.8 filed on Jul. 14, 2014; and DE 10 2014 110 791.8 filed on Jul. 30, 2014. The subject application claims priority to PCT/EP 2015/058379, DE 10 2014 010 246.7, DE 10 2014 010 321.8, and to DE 10 2014 110 791.8 and incorporates all by reference herein, in their entirety.

BACKGROUND OF THE INVENTION

The present invention relates to the technical field of protective apparels designed in particular for military deployment and having specifically a protective function against ballistic objects and/or projectiles, in particular in the form of fragments or the like, and thus offering an appropriate form of fragment protection.

The present invention more particularly relates to a protective apparel unit, in particular a protective apparel unit comprising fragment protection, having a protective function against fragments caused and/or released by detonation and/or explosion, comprising outerwear and/or underwear and also optionally comprising separate head and/or face protection, neck protection, shoulder protection, arm protection, hand protection, trunk protection, torso protection, genital/anal protection and/or knee/leg protection, wherein the protective apparel unit of the present invention is provided specific fragment protection elements to form the fragment protection function.

The present invention similarly relates to the use of a multiplicity of fragment protection elements as such to form/provide a complementary/individually adaptable protective function, and/or to form or provide a protective apparel unit offering protection against fragments caused/released by detonation/explosion.

The present invention further also relates to the use of at least one fragment protection element and/or at least one fragment protection device in the form of a fragment protection collar, a fragment protection cloth/tube, a genital/anal fragment protection, knee fragment protection, hand fragment protection and/or a wrist fragment protection for further/supplementary, particularly individually conformable/adaptive enhancement of the protective function of the protective apparel unit of the present invention against fragments caused/released by detonation/explosion, in particular with regard to providing an additional/complementary protection for defined bodily regions/portions.

People deployed in the military sector and also in the field of terrorism defense, such as soldiers in military units, border guards, police officers, security personnel or the like, are by virtue of their deployment, be it in military fighting or peacekeeping operations, anti-terrorist operations and/or operations for specifically military or terrorism defense, often confronted with an acute or at least latent risk of direct bodily harm as caused for example not only by the use of firearm/stabbing weapons but also by exposure to or the explosion of explosive devices. Specifically fragment-releasing explosive devices must be mentioned in this context because they can lead to occasionally life-threatening and also multiple injuries in people exposed to such an explosion. The people in question may be more particularly people/soldiers deployed in military fighting/peacekeeping operations and/or in the field of terrorism defense who are doing their service for example in international crisis/trouble-spot regions.

An acute threat in this context for the people/soldiers deployed resides in improvised explosive devices (IEDs). Explosive devices of this type have evolved into a subtle instrument offering a high potential of injury/endangerment in the confrontation with and/or warfare against the aforementioned groups of people, in particular soldiers.

Improvised explosive devices are also associated with a high level of hazard potential because they are often made without major technical investment and may in this context also vary in material, size and also appearance, adding to the difficulty of localization and identification. In addition, improvised explosive devices often develop enormous destructive power, entailing a correspondingly high risk of injury, particularly as a consequence of the explosive-type release of primary and secondary fragments and the emanation of a powerful pressure wave on the one hand and also of fire and heat on the other.

In general, the way improvised explosive devices work is that explosive materials are ignited to cause the explosive device to burst, entailing the explosive-type release of primary fragments which together with the simultaneously created pressure wave emanate at high speed from the site of explosion. In addition, the pressure wave and the resultant primary fragments can lead to the subsequent release of secondary fragments, often in the form of (micro) particles, such as dirt, dust and sand as well as fragments of destroyed objects from the direct and/or indirect surroundings of the site of the explosion of the explosive device. These secondary fragments may for example also come from materiel items, vehicles (such as vehicle interiors), or the like, destroyed by the explosion.

Owing to the way improvised explosive devices work, involving the explosive release of fragment (projectiles), people exposed to such explosions may suffer occasionally large-area and serious injuries, resulting particularly from the penetration of primary and secondary fragments into the body, but also due to the pressure wave emanating from the explosion and/or the exposure to fire and heat.

A distinction is generally made between a primary blast radius and a secondary blast radius emanating from the site of the explosion.

The survival chances of a person within the primary blast radius are but minimal not only owing to the high speed and amount of fragments released but also owing to the high exposure to heat/fire, survival probability does increase with increasing distance from the site of the explosion. This is because an affected person within the secondary blast radius will be hit predominantly by secondary fragments of lower impact energy, although this may occasionally none the less lead to serious injuries of differing type and intensity. These impacting fragments may penetrate through the upper skin layers of the person affected but also deeply into the body, entailing destruction of and/or injury to even physiologically important structures in the body, for example blood vessels, nerve tracks, organs or the like.

The penetration of an affected person by secondary fragments particularly within the secondary blast radius generally also entails a heightened risk of infection, particularly since in the event of a heightened level of fragment density contaminated secondary fragments can impact the body in high number and close together (i.e., at high fragment density), occasionally penetrating deeply into the skin and/or tissue. Primary fragments are also capable of leading to comparable sequelae.

Even small sizes of fragment represent a considerable problem in this regard, since by virtue of their large quantity and high impact density/velocity they similarly lead to serious injuries, entailing a heightened risk of infection.

Increasing remoteness from the site of the explosion generally also increases the flight level of fragments emanating from a ground-level explosion, leading with increasing distance to large-area injuries in nearly all areas/regions of the body.

In general, however, a frequent scenario of injury consists in corresponding damage being present from the lower extremities to the lower torso region of an affected person, although with increasing remoteness from the site of the explosion there may also be injuries to the upper extremities and also to the specifically lateral upper body through to the neck and the face.

In this context, persons confronted with an explosion of improvised explosive devices, even when they are wearing a ballistic-protective vest for the chest and/or upper body region, often suffer injuries that may be severe and life-threatening to the following bodily regions/areas: (i) lower extremities; (ii) genitals and also internal sexual organs; (iii) bladder and urinal tract (urogenital tract); (iv) perineal and anal region; (v) lower abdomen including intestines, kidneys, spleen and liver; (vi) specifically lateral torso with parts of the lungs; (vii) rearward torso in the renal pelvic region and the spinal column; (viii) upper extremities and shoulder region; and also (ix) neck and lower part of the face. Occasionally serious injuries additionally also result in general to the specifically near-surface arterial and venous system and also to the skin surface, in particular due to fragment penetration and heat exposure in the aforementioned portions of the body.

In this context, it is generally penetration injuries to those bodily areas/regions that are problematical where the blood vessel system (aorta and venous system) is relatively close to the skin surface, since in these regions there is a particularly high risk of injuring sanguiferous vessels resulting in a correspondingly high loss of blood, entailing a risk of exsanguination and/or hypotonia. These include specifically the genital region and the region of the thighs and also of the knee and/or poplitial cavities. Regions particularly sensitive to injury additionally also include the inner thighs with the adjoining perineal and anal region, the region of the spinal column, the lower abdominal region, the neck region with the carotid arteries extending there, the shoulders and the arms including the elbows/cubita and including the region of the wrists, and also the specifically lower part of the face.

The region of the abdominal cavity containing the gastrointestinal tract and also the urinal tract is also extremely problematical with regard to any fragment penetration, since said organs/organ portions are at least partly filled with liquids which may include infectious bacteria, so an injury in these regions resulting in a corresponding release of liquid may lead to serious systematic infections. It must also be noted in relation to the internal organs specifically in the region of the abdominal cavity that these, owing to their being filled with liquid (as in the case of the urinary bladder, for example), may absorb the kinetic energy associated with the impact of fragments and thereby burst.

Moreover, the injuries caused often require serious surgical interventions, up to and including the amputation of extremities and/or the genitals. Often the people affected will then also suffer a sustained loss of mobility and/or a sustained reduction in quality of life.

The above remarks serve to show, altogether, that there is a need in the prior art to provide an effective protective system in the form of apparel items offering a protective effect against fragments released by explosion/detonation that combines good handleability and good wearing comfort with ensuring a large-area protective function which is adaptable individually and/or with respect to the underlying threat situation (i.e., not only with regard to the size and number of the bodily regions to be protected but also with regard to the degree of protection to be afforded to the particular bodily regions to be protected) while a system of this type shall also be suitable for prolonged donning and for providing a prolonged/long-term protective function.

Yet systems of this type are hitherto unknown in the prior art. On the contrary, the prior art is chiefly focused on providing such ballistic-protective devices as not only do not focus specifically on fragment protection but also are only capable of protecting in some fashion individual bodily regions/portions as such, as is the case for example with protective vests or helmets, in that devices of this type often fail to offer optimal wearing comfort, thereby reducing wearer acceptance and hence wearing time overall.

The prior art chiefly discloses protective devices which merely provide a form of protection against objects released in projectile fashion that is partial and/or not harmonizable with one another. Examples thereof are, as previously noted, ballistic-protective vests which as well as but minimal wearing comfort and complicated handling offer a merely portionwise form of protection for the upper body. In addition, ballistic helmets to give head protection and also removable low-protection devices and protective devices for the neck region are known as such. As noted above, protective devices of this type merely provide an isolated and/or localized form of protection while the devices, as used above, further in general have the disadvantage that, owing to the reduced conformability to the body and/or the non-ideal fit, the wearing comfort is low and, what is more, protection is occasionally reduced according to the posture of the wearer.

Moreover, the materials employed in the prior art to provide the protective devices further do not always have the desired durability with regard to the ballistic stability. Moreover, the haptic properties are not always ideal.

The prior art regarding the provision of protective devices to ensure a certain level of protection against objects released explosively and/or in the manner of a projectile is further additionally geared chiefly to the employment of materials/yarns to form textile fabrics based on para-aramid (interchangeably also known as poly(p-phenyleneterephthalamide) (PPTA)).

Such systems based on para-aramid do admittedly have a certain level of strength, impact resistance and also elongation at break and hence in principle some suitability for use as a fragment protection material, but there is a central disadvantage with para-aramids in that they are neither UV-stable nor moisture-stable, and therefore corresponding materials based on para-aramids lose their strength properties and hence their ballistic-protective function on exposure to UV radiation and/or moisture, such as perspiration or washing and/or rain water. This is another reason why these materials have a but minimal ability to be washed/cleaned, which is equally disadvantageous.

Moreover, fibers/yarns/threads based on para-aramid have a but low level of breaking strength at right angles to their longitudinal axes, which is disadvantageous particularly for processing these materials into corresponding textile fabrics particularly in the form of formed-loop knits, since bending (as in the case of loop formation, for example) may provoke yarn/fiber breakage. In order to offset this disadvantage, para-aramids are in principle employable in the form of a staple fiber yarn, but yarns of this type have numerous interruptions in their fibrous structure, adversely affecting the stability and hence the ballistic resistance of the resulting textile fabric. Abrasion resistance is also down, which is similarly disadvantageous with regard to the durability/stability thereof, too. Textile fabrics utilizing staple fiber yarns based on para-aramid additionally have a rough surficial texture/touch, thereby reducing the wearing comfort in that the wearer may experience skin irritation.

To address the aforementioned disadvantageous material-related properties of para-aramids in some way, the prior art occasionally provides that the material based on para-aramids be rendered water-repellent and/or be sealed into film in order to counteract the degenerative process of stability loss due to, in particular, moisture or UV radiation. Such an approach, however, is disadvantageous in that the wearing comfort of the resulting materials degrades as a result, since, in the donned state, moisture transportation is reduced/prevented and, what is more, the air permeability of the material is also disadvantageously affected.

Owing to their high sensitivity to UV radiation, the underlying materials are in principle also not suitable to be used for protective apparel in the form of outerwear. In this context, even drying/storing the materials under solar irradiation with corresponding UV exposure is problematical.

In this context, DE 30 34 547 C2 relates to an apparel piece having at least one penetration-inhibiting sheetlike element formed of a plurality of three-dimensionally shaped and mutually consolidated plies formed of textile areas of aramid fiber, wherein the sheetlike element is consolidated, by quilting, in a pre-selected shape adapted to the body shape of the wearer. In addition to the above-adduced disadvantages associated with the use of para-aramid, the material described also has in principle a non-optimal wearing comfort because of the consolidation envisaged. In addition, this document is focused on individual apparel pieces as such, without providing a holistic, adaptive form of protection.

In addition, WO 99/37969 A1 and also the same patent family members DE 198 02 242 A1 and/or EP 1 058 808 A1 and/or U.S. Pat. No. 6,656,570 B1 relate to a protective apparel against stabbing injuries which is said to ensure a certain amount of protection against needlelike pointed objects, wherein the protective apparel consists of two or more plies of sheetlike constructs formed from break-resistant materials, wherein more than one of the plies is coated with a layer of cermet material. The focus here is on using woven aramid fabrics to form the plies. Owing to the mandatorily envisioned layer of cermet material, conformability and wearing comfort are down. An intentional way to align different kinds of protective elements to provide one protective apparel that covers a multiplicity of bodily places in an individually conformable manner is not described.

BRIEF SUMMARY OF THE INVENTION

In summary, the devices/materials adduced in the prior art do not always have optimal performance and stability characteristics, particularly with an eye to providing durable ballistic resistance to fragment impact and also good wearing comfort for the protective apparel pieces manufactured from the materials. In addition, the focus of the prior art is chiefly on those protective apparel articles which confine the protective function they provide to narrowly localized portions of the body without any consideration being given to a holistic, individually conformable and/or adaptive protective system.

Altogether this is another reason why there is an immense need to provide specific protective apparel systems which simultaneously combine high protective performance against fragments released by detonation/explosion with high wearing comfort and in which a protective function individually conformable and/or adaptive to the underlying threat situation in particular is possible for an individual multiplicity of body areas/regions of a wearer.

It is against this background that the present invention therefore has for its object to make available an efficient concept for providing a protective apparel unit wherein the above-narrated disadvantages of the prior art shall be at least substantially avoided or else at a minimum ameliorated.

It is more particularly an object of the present invention to provide a protective apparel unit which, over the prior art, has an improved ballistic-protective function particularly against fragments released by detonation/explosion. The protective apparel unit provided according to the present invention shall here also have a high wearing comfort and a high stability also to moisture and UV radiation, in keeping with the protective function being maintained even for prolonged periods.

It is similarly in turn a further object of the present invention to provide a corresponding protective apparel unit where the underlying fragment protection is individually and/or situationally adjustable particularly with regard to the body regions/portions to be protected, in particular with regard to the underlying potential threat confronting the wearer of the protective apparel at the site of action, deployment and/or operation. The objective here is to provide overall a fragment-protective apparel unit which is individually configurable and in which not only the type and size of the bodily regions to be protected but also the degree of protection afforded to the particular bodily regions to be protected are individually adjustable and/or custom-tailorable. In this context, a rapid configuration and/or adjustability of the protective apparel unit under in-service conditions, for example, shall also be ensured according to the present invention.

To achieve the above-defined object, the present invention accordingly proposes—in a first aspect of the present invention—a protective apparel unit, in particular a fragment-protective apparel unit, preferably having a protective function against fragments caused and/or released by detonation and/or explosion, with outerwear and/or underwear and also optionally with separate head and/or face protection, neck protection, shoulder protection, arm protection, hand protection, trunk protection, torso protection, genital and/or anal protection and/or leg protection is disclosed; further advantageous developments and elaborations of this aspect of the present invention form relating to the protective apparel unit of the present invention is further disclosed.

The present invention further provides—in a second aspect of the present invention—the method of using a multiplicity of fragment protection elements to form and/or provide a complementary and/or mutually complementing and/or individually adaptable protective function against fragments caused and/or released by detonation and/or explosion, and/or provide a corresponding protective apparel unit as per the independent use claims in this regard.

Finally, the present invention further provides—in a third aspect of the present invention—the method of using at least one fragment protection element in the form of a thigh-type fragment protection element, of an elbow-type fragment protection element, of a shoulder-type fragment protection element, of a genital-type fragment protection element and/or at least one fragment protection device in the form of a fragment protection collar, of a fragment protection cloth and/or of a fragment protection tube, of a genital/anal-type fragment protection, of a knee-type fragment protection, of an elbow-type fragment protection, of a hand-type fragment protection and/or of a wrist-type fragment protection for body-part specific and/or body-portion specific enhancement of the protective function against fragments caused and/or released by detonation and/or explosion and/or to form and/or provide a protective apparel unit in particular having complementary and/or mutually complementing and/or individually adaptable protective function against fragments caused and/or released by detonation and/or explosion, as per the independent use claim in this regard.

It will be readily understood that, in the hereinbelow following description of the present invention, such versions, embodiments, advantages, examples or the like as are recited hereinbelow in respect of one aspect of the present invention only, for the avoidance of unnecessary repetition, self-evidently also apply mutatis mutandis to the other aspects of the present invention without the need for any express mention.

It will further be readily understood that any values, numbers and ranges recited hereinbelow shall not be construed as limiting the respective value, number and range recitations; a person skilled in the art will appreciate that in a particular case or for a particular use, departures from the recited ranges and particulars are possible without leaving the realm of the present invention.

Moreover, any hereinbelow recited value/parameter particulars or the like can in principle be determined/quantified using standard/standardized or explicitly recited methods of determination or else using methods of determination/measurement which are per se familiar to a person skilled in the art. Unless otherwise indicated, the underlying values/parameters are determined under standard conditions (i.e., particularly at a temperature of 20° C. and/or at a pressure of 1013.25 hPa or 1.01325 bar).

As for the rest, any hereinbelow recited relative/percentage, specifically weight-based, recitations of quantity must be understood as having to be selected/combined by a person skilled in the art within the context of the present invention such that the sum total—including where applicable further components/ingredients, in particular as defined hereinbelow—must always add up to 100% or 100 wt %. However, this is self-evident to a person skilled in the art.

Having made that clear, the present invention will now be more particularly described and this also by means of drawings/figures depicting preferred and/or exemplary embodiments.

The context of elucidating these preferred and/or exemplary embodiments of the present invention, yet which are not in any way limiting in respect of the present invention, will also be used to point out further advantages, properties, aspects and features of the present invention.

BRIEF DESCRIPTION OF THE DRAWINGS

FIG. 1 B shows a further schematic depiction of the construction of a knitted textile fabric employed for fragment protection elements in the form of a weft-knitted fabric produced with independently-movable needles according to an alternative embodiment of the present invention, wherein the structural elements furthermore take the form of tuck loops;

FIG. 3 B shows a cross-sectional depiction of a protective apparel unit and/or a fragment protection element of multi-plied construction and with a complementing textile covering material;

FIG. 4 B is a schematic depiction corresponding to FIG. 4 A and shows a posterior plan view of the short-legged underpant;

FIG. 4 C shows a schematic depiction giving an frontal plan view of a protective apparel of the present invention in the form of a short-legged underpant, according to which the underpant is additionally endowed with devices for accommodating further fragment protection elements attachable to and/or incorporable in the protective apparel unit of the present invention to form a supplementing/complementary form of protection, wherein the additional fragment protection elements take the form of thigh-type fragment protection elements and of a genital-type fragment protection element, respectively;

FIG. 5 B is a schematic depiction corresponding to FIG. 5 A and shows a posterior plan view of the long-legged underpant;

FIG. 6 B is a schematic depiction corresponding to FIG. 6 A and shows a posterior plan view of the under- and/or overshirt;

FIG. 7 B shows a schematic depiction giving a frontal plan view of an additional fragment protection device in the form of a fragment protection cloth/tube which may take the form of a fragment protection bandana, as an optionally further constituent of the protective apparel unit of the present invention to ensure a complementing form of fragment protection;

FIG. 7 C shows a schematic depiction giving a frontal plan view of an additional fragment protection device in the form of a fragment protection hood/cowl which may take the form of a fragment protection balaclava, as an optionally further constituent of the protective apparel unit of the present invention to ensure a complementing form of fragment protection;

FIG. 7 D shows a schematic depiction in the lateral plan view of an additional fragment protection device in the form of a hand-type fragment protection and/or a wrist-type fragment protection as an optionally further constituent of the protective apparel unit of the present invention to ensure a complementing form of fragment protection.

DETAILED DESCRIPTION OF THE INVENTION

Figure 1A:
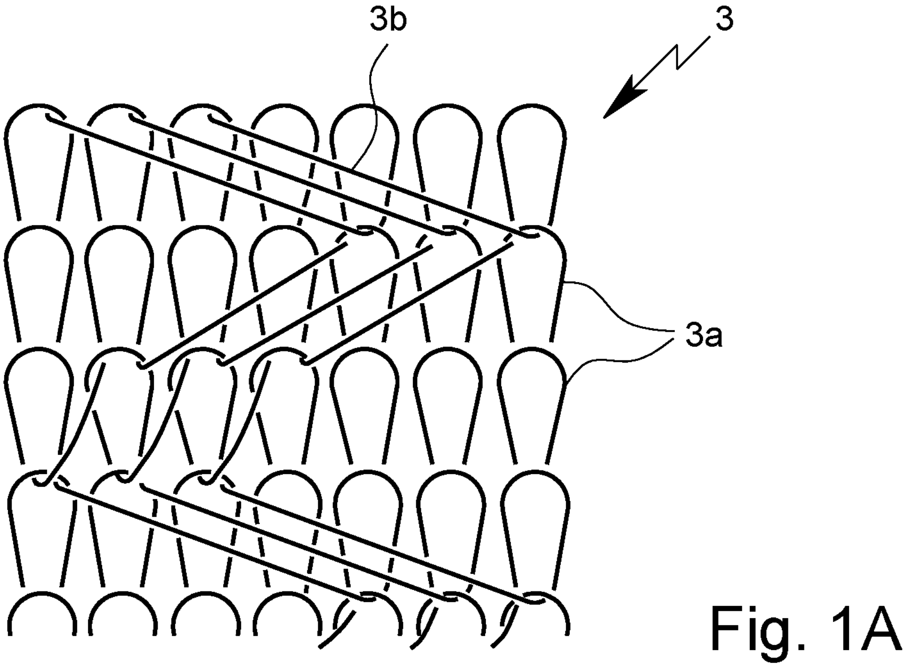
FIG. 1 A shows a schematic depiction of the construction of a knitted textile fabric according to an embodiment of the present invention to form the fragment protection elements employed according to the present invention, wherein the knitted textile fabric takes the form of a formed-loop knit having structural elements in the form of floats.

The applicant has now found that, completely surprisingly, protective apparel, in particular protective apparel for military deployment, will afford, in a purpose-directed manner, an effective form of fragment protection particularly against fragments released by detonation/explosion, for example fragments explosively released/caused in the explosion of improvised explosive devices, when the protective apparel unit of the present invention utilizes specifically formed fragment protection elements composed of a very specific material having very specific properties. Moreover, the degree of fragment protection afforded may be further advanced by employing complementing, individually configurable fragment protection devices that are attachable to the protective apparel unit of the present invention.

The term "fragment protection" as used according to the present invention is to be understood as having a very broad meaning and as relating more particularly to the providing of a protective function against the penetration of ballistic projectiles released directly or indirectly by detonation/explosion, particularly said ballistic projectiles in the form of fragments which are more particularly notable for small particle sizes and for an irregular shape, and which more particularly are explosively released in the form of primary and/or secondary fragments in the course of the detonation of improvised explosive devices and hit people exposed to the detonation at high speed and/or kinetic energy.

Here it is a central concept of the present invention that the fragment protection provided according to the invention is—through specific formation and arrangement of fragment protection elements providing said fragment protection and also of optionally further fragment protection devices—individually adjustable/adaptable, not only with respect to the particular threat situation (i.e., particularly according to the risk of confrontation with improvised explosive devices) but also with regard to the individual constitution of the wearer of the protective apparel unit according to the present invention.

It is in this context that the present invention makes it possible to provide an individually oriented and/or custom-tailored protective apparel unit where the protection provided is, as it were, flexible and takes account of the particular conditions of deployment (and this not only with regard to the extent, i.e., area, of the body regions to be protected but also with regard to the degree of protection provided), and what is more the concept of the present invention, involving the individual adaptability of the protective function on the basis of the fragment protection elements employed, also meets the requirements of clothing physiology.

In effect, the focus of the present invention is on a concept for providing fragment protection whereby specific fragment protection elements assigned to defined bodily regions/portions in the donned state are integrated in an apparel piece in that these fragment protection elements are firmly bonded to the protective apparel unit. To precisely adjust the level of protection, the apparel piece may utilize further fragment protection elements attachable thereto and/or incorporable therein and more particularly forming a releasable bond to the protective apparel unit. Fragment protection may also be further enhanced using additional fragment protection devices which by way of further complementation may be, as it were, adaptively worn with and/or attached to the protective apparel unit. The multistage and complementary protection provided according to the present invention thus in effect allows for considerable variation in the formation of an individual form of fragment protection.

The present invention in this context makes it possible, in a non-limiting manner, to proceed from a basic form of fragment protection, whereby a form of, so to speak, baseline protection is provided particularly with regard to the physiologically relevant and/or potentially endangered regions of the body, and provide a complementing additional form of protection, enhancing altogether the overall level of protection, particularly on the basis of complementing fragment protection elements individually attachable to and/or incorporable in the protective apparel unit of the invention and/or on the basis of further fragment protection devices, as will be more particularly discussed hereinafter.

The present invention provides the basis for sustainably reducing/preventing the penetration of fragments in relation to the people affected thereby, in particular by virtue of the specific properties of the fragment protection elements and/or devices employed for the purposes of the present invention.

In a first aspect of the present invention, therefore, the present invention provides—according to a first embodiment of the present invention that is in accordance with this aspect—a protective apparel unit 1, in particular a fragment-protective apparel unit, preferably having a protective function against fragments caused and/or released by detonation and/or explosion, with outerwear and/or underwear and also optionally with separate head and/or face protection, neck protection, shoulder protection, arm protection, hand protection, trunk protection, torso protection, genital and/or anal protection and/or leg protection, wherein the protective apparel unit 1 includes mutually different specifically textile fragment protection elements 2 which in the donned state are assigned to and/or cover different bodily regions, preferably having a protective function against fragments caused and/or released by detonation and/or explosion, wherein the fragment protection elements 2 each independently include or consist of at least one ultra high molecular weight polyethylene (UHMW-PE), and wherein the fragment protection elements 2 each independently have a fragment and/or ballistic protection value $V_{50}$, determined as per STANAG 2920, of at least 180 m/s.

These STANAG 2920 $V_{50}$ ballistic protection values specified according to the present invention relate particularly to a determination by use of projectiles in the form of right circular cylinders (RCCs) having a projectile weight of 0.13 g. The $V_{50}$ ballistic protection values adduced as per STANAG 2920 are determined, in particular, at a temperature of (20±2°) C. and, in particular, at a relative humidity of (65±4)%.

In this context, the high protective properties of the protective apparel unit according to the present invention are ensured by the invention specifying, at not less than 180 m/s, a high STANAG 2920 $V_{50}$ value which more particularly is attained even by the single-plied form of the particular fragment protection element 2.

This $V_{50}$ value refers more particularly to the velocity (m/s) at which, for a defined projectile and selected (test) material, the probability of the projectile causing the material to become perforated/penetrated is 0.5 (where 1 equals the maximum probability) or 50%. For further information, reference may be made to the corresponding standard as per STANAG 2920.

The present invention thus provides a ballistic-type fragment protection based on the protective apparel unit 1 according to the present invention, and which is the basis for providing enhanced protection for the body against fragments with regard to improvised explosive devices in particular. Owing to the employment of specific materials for the underlying fragment protection elements 2 in the manner of the present invention, it is not only the outstanding level of fragment protection which is provided but also a very good wearing comfort in respect of protective apparel unit 1 according to the present invention, this also leading to an improved wearer/user acceptance, since protective apparel unit 1 according to the present invention, in addition to the outstanding and durable ballistic-type fragment protection, provides a high level of moisture and heat exchange coupled with good permeability to air for the underlying materials. Moreover, not least by virtue of the low thickness of the material, protective apparel unit 1 according to the present invention has a low (basis) weight, which is beneficial for a high wearing comfort and, what is more, does not lead to any significant sacrifices regarding the ability of the wearer to move.

According to the present invention, therefore, the protective apparel unit 1 evinces a high protective function against primary and secondary fragments caused/released by improvised explosive devices in particular, in that the adaptive/complementary protection is also able to extend to those bodily regions which previously obtainable systems were unable to protect from fragment exposure to a sufficient degree, if at all. Owing to the outstanding properties, as materials, of the materials employed as fragment protection elements 2, even microparticles are in principle prevented from penetrating, making altogether for a very comprehensive and efficient system of protection.

The outstanding fragment protection properties serve to significantly reduce life-threatening injuries caused by confrontation of a wearer of the protective apparel unit 1 according to the present invention with the explosion of improvised explosive devices, which leads to an increase in survival probability. More particularly, the concept of the present invention is also the basis for effective protection with regard to physiologically relevant portions of the body, including in particular with regard to the arterial and/or venous system.

The basis of the concept of the invention is that the protective apparel unit 1 of the present invention includes a fragment protection system based on individually deployable and/or configurable fragment protection elements 2 integratable in the protective apparel unit 1 which, in combination, ensure an individually adaptable protection for the body, as will be elaborated hereinafter. These fragment protection elements 2 may in the present invention be individually formed and arranged within protective apparel unit 1 in a specifically integrated manner and/or be an integral constituent of protective apparel unit 1, as depicted by way of example in, for instance, FIGS. 4A, 4B, 4C, 5A, 5B, 6A and 6B.

Fragment protection elements 2 employed according to the present invention may thus be not only directly integrated/incorporated in (i.e., form a firm bond with) the underlying protective apparel unit 1 (for example on the basis of underwear in the form of an undershirt and/or an underpant) but also be attached to and/or imported into the protective apparel unit 1 (i.e., form a detachable bond therewith) in the form of individual and/or separate elements. Moreover, the protective apparel unit 1 may be endowed/modified with further fragment protection devices which in turn include specific fragment protection elements. The present invention thus provides in protective apparel unit 1 of the present invention a functional-type apparel system comprising individual apparel elements (in the form of outer- and/or underwear for example) incorporating the particular firmly integrated fragment protection elements 2, while the protective apparel unit 1 and/or the apparel system may further be complemented with fragment protection elements 2 which are mobile and/or are moreover individually attachable to and/or importable into the protective apparel unit 1, and also with further fragment protection devices 8 to 13 (which in turn may include or consist of further fragment protection elements 2).

These fragment protection elements 2 are each assigned in the donned state to specific regions of the body in the context of the present invention, so the particular fragment protection elements 2 perform a protective function for one specific region of the body each. As further elaborated hereinafter, the particular fragment protection elements 2 may take the form, for example, of a thigh-type fragment protection element 2*a*, of a detachable thigh-type fragment protection element 2*a*', a genital-type fragment protection element 2*b*, a detachable genital-type fragment protection element 2*b*', an anal/perineal region fragment protection element 2*c*, a leg-type fragment protection element 2*d*, a detachable knee-type fragment protection element 2*e*, a urinary bladder tract fragment protection device (underpant) 2*f*, a urinary bladder tract fragment protection element (under- and/or overshirt) 2*f*', a renal pelvis type fragment protection element (underpant) 2*g*, a renal pelvis type fragment protection element (under- and/or overshirt) 2*g*', a torso-type fragment protection element 2*h*, an arm-type fragment protection element 2*i*, a detachable elbow-type fragment protection element 2*j*, a detachable shoulder-type fragment protection element 2*k*, a neck-type fragment protection element 2*l*, a neck/face-type fragment protection element 2*m*, a hand-type fragment protection element 2*n* and/or a wrist-type fragment protection element 2*o*. The further fragment protection devices may further take the form for example of a fragment protection collar 8, a fragment protection cloth/tube 9, a genital/anal-type fragment protection 10, a knee-type fragment protection 11, an elbow-type fragment protection 11', a hand-type fragment protection 12 and/or a wrist-type fragment protection 13. In principle, as noted above, the fragment protection devices 8 to 13 may similarly comprise or consist of fragment protection elements 2.

Fragment protection unit 1 of the present invention may also be complemented by being combined with already existing protective systems, such as a ballistic-protective vest, a ballistic-protective helmet and/or a pair of fragment protection goggles.

The present invention altogether succeeds in uniting the diametrically opposite or contrary properties of a high protective function on the one hand and a high wearing comfort and/or good handleability in one and the same material on the basis of the protective apparel unit 1 according to the invention, making it possible to provide an individually adaptable form of fragment protection that takes individual account of the particular operational conditions in respect of the underlying threat potential.

In this, protective apparel unit 1 of the present invention is also notable for ease of handling in that, more particularly, the protective apparel unit 1 and/or the individual constituents are quick and simple to put on and take off. Moreover, protective apparel unit 1 of the present invention may be carried to a certain extent as a covertly wearable protective system, which moreover allows for integration into an already existing protective and/or apparel system (in the form of a complementing protective suit for example).

The concept of the present invention may be the basis for using protective apparel unit 1 of the present invention in a specific manner to functionally complement/endow a protective suit, in particular a military-type protective suit, which generally may take a single-piece form (as an overall for example) or else a two-piece form (as jacket and pant for example), and which may for example be provided NBC protection and/or camouflage, with regard to fragment protection. The present invention thus also provides protective apparel unit 1 as such, combined with a specifically conventional protective suit and/or included therein.

The present invention thus specifically also provides a protective apparel unit 1 comprising a specifically military-type protective suit (in particular as outerwear apparel), which may be combined with further apparel pieces (for example in the form of outer- and/or underwear, in particular as defined hereinafter), which are endowed with the corresponding fragment protection elements 2 and/or which with additional fragment protection devices in particular as defined hereinafter, to form fragment protection unit 1.

Protective apparel unit 1 of the present invention may thus also include a protective suit as such optionally no fragment protection and which may be combined with the herein described further constituents of the protective apparel unit 1 to form the protective apparel unit 1 of the present invention.

Further regarding the present invention, the fragment protection elements 2, as noted above, utilize a very specific material in the form of an ultra high molecular weight polyethylene (UHMW-PE), in particular in the form of a yarn and/or thread and/or strand, more preferably in the form of a yarn, to form a textile fabric. In this context, the applicant found that, completely surprisingly, the employment of such a specific material is particularly suitable to form the fragment protection elements 2 and has significant advantages over the prior art materials based, for example, on para-aramids. This is because the ultra high molecular weight polyethylene used in the present invention to form the fragment protection elements 2 has in the form of yarns/threads/strands a very high tenacity and also a high level of toughness, a high level of breaking and/or bending strength and a very high modulus of elasticity. Moreover, UHMW-PE is moisture- and UV-resistant, which similarly causes the materials employed according to the invention to have a high stability to laundering, entailing a high stability/durability for the ballistic-protective function. In addition, the materials employed on the basis of UHMW-PE are physiologically unconcerning and also skin friendly, so the wearing of the protective apparel according to the present invention does not cause any skin irritation. Furthermore, the material used has a very high level of chemical resistance and also an outstanding level of bacterial resistance.

Figure 1B:
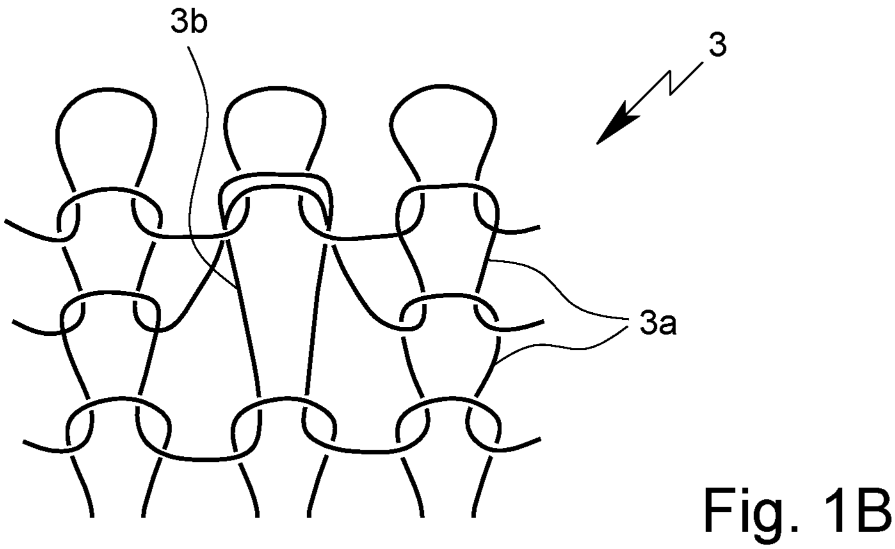

Further regarding protective apparel unit 1 of the present invention, it is preferable for the purposes of the present invention for the fragment protection elements 2 each independently to include at least one knitted textile fabric 3 and/or be formed as and/or consist of a knitted textile fabric 3. This knitted fabric 3 is preferably a material based on UHMW-PE. In this context, the present invention may provide that the knitted fabric 3 includes a multiplicity of needle loops 3*a* and a multiplicity of at least one other structural element 3*b*. FIG. 1A and FIG. 1B may be referenced here in particular.

Providing the fragment protection elements 2 in the form of a knitted textile fabric 3 has the advantage that the underlying textile sheet material is by virtue of the knitted structure elastic, extensible, conformable and flexible, which further improves the wearing comfort coupled with the high level of fit accuracy and also having the effect that the protective apparel unit 1 is readily packable and transportable and there are altogether outstanding properties with regard to clothing physiology.

In addition, the textile construction can be compressed and folded without damaging the structure of the material, in that the material, after the confining force has been removed, will correspondingly reassume its original shape, consistently maintaining the level of protection even on this basis.

The underlying knitted structure of the knitted textile fabric 3 augments not just the wearing comfort, but also the ballistic-resistant properties and thus the fragment protection function provided according to the present invention, in particular by virtue of the formation of a firm (knitted) assembly involving the knitted textile fabric 3.

The present invention is particularly advantageous when the fragment protection elements 2 each independently include at least one knitted textile fabric 3 in the form of a formed-loop knit, in particular warp-knitted fabric and/or weft-knitted fabric produced with fixed needles, preferably warp-knitted fabric, and/or in the form of a weft-knitted fabric produced with independently-movable needles, more preferably in the form of a weft-knitted fabric produced with independently-movable needles. In particular, the fragment protection elements 2 may each independently be formed as knitted textile fabric 3 in the form of a formed-loop knit, in particular a warp-knitted fabric and/or weft-knitted fabric produced with fixed needles, preferably warp-knitted fabric, and/or in the form of a weft-knitted fabric produced with independently-movable needles, preferably in the form of a weft-knitted fabric produced with independently-movable needles. In this context, the knitted fabric 3, in particular in the form of a formed-loop knit, may include a basic structure selected from the group of pillar, tricot, cord, satin, velvet and atlas. This yet further improves the above-adduced properties regarding ballistic-type fragment protection on the one hand and wearing comfort on the other.

Therefore, in accordance with the first aspect of the invention, the present invention also provides an alternative embodiment wherein there is provided according to the invention a protective apparel unit 1, in particular a protective apparel unit comprising a single- or two-part suit and/or underwear and also optionally separate leg protection, trunk protection, torso protection, genital protection, neck protection, head protection, face protection, arm protection and/or hand protection, in particular a protective apparel unit 1 as described above, wherein the protective apparel unit 1 includes mutually different specifically textile fragment protection elements 2, preferably textile fragment protection elements, which in the donned state are assigned to and/or cover different bodily regions, preferably having a protective function against fragments caused and/or released by detonation and/or explosion, wherein the fragment protection elements 2 each independently include or consist of at least one ultra high molecular weight polyethylene (UHMW-PE), and wherein the fragment protection elements each independently include at least one knitted textile fabric 3 and/or are formed as knitted textile fabric 3, wherein the knitted textile fabric 3 includes a multiplicity of needle loops 3*a* and a multiplicity of at least one other structural element 3*b*. FIG. 1A and/or FIG. 1B may similarly be referenced in this connection, because they show different forms of the knitted textile fabric 3.

It is also in this alternative embodiment of the present invention that the fragment protection elements 2 may each independently have a fragment and/or ballistic protection value $V_{50}$, determined as per STANAG 2920, of at least 180 m/s.

Regarding in this connection the fragment protection elements 2 in general, they should each independently have a fragment and/or ballistic protection value $V_{50}$, determined as per STANAG 2920, of at least 200 m/s, in particular at least 225 m/s, preferably at least 250 m/s, more preferably at least 275 m/s, yet more preferably at least 300 m/s, yet still more preferably at least 325 m/s, yet still even more preferably at least 350 m/s.

In this context, the fragment protection elements 2 should each independently also have a fragment and/or ballistic protection value $V_{50}$, determined as per STANAG 2920, in the range from 180 m/s to 800 m/s, in particular from 200 m/s to 750 m/s, preferably from 225 m/s to 700 m/s, more preferably from 250 m/s to 650 m/s, yet more preferably from 275 m/s to 600 m/s, yet still more preferably from 300 m/s to 550 m/s, yet still even more preferably from 325 m/s to 525 m/s, yet still even further preferably from 350 m/s to 525 m/s.

The fragment protection elements 2 employed according to the present invention thus have an outstanding ballistic-protective performance. The knitted textile fabric 3 employed in the present invention with regard to the fragment protection elements 2 thus meets the high requirements expected of an effective form of ballistic-type fragment protection, while the material additionally has a high level of cutting, tearing, impact and stabbing resistance. The properties underlying the material are effective in preventing the penetration of (fragment) projectiles hitting the material, and also serve to minimize the effects of the pressure wave associated with the detonation of an improvised explosive device.

The above-adduced knitted textile material 3 underlying the fragment protection elements 2 should further be, as noted above, configured in the form of a formed-loop knit, in particular warp-knitted fabric and/or weft-knitted fabric produced with fixed needles, preferably warp-knitted fabric, and/or in the form of a weft-knitted fabric produced with independently-movable needles, preferably in the form of a weft-knitted fabric produced with independently-movable needles. The invention may provide in this context that the knitted textile fabric 3, in particular in the form of a weft-knitted fabric produced with independently-movable needles, includes a basic structure selected from the group of pillar, tricot, cord, satin, velvet and atlas, and/or wherein the knitted fabric 3 includes a plain, rib or purl construction.

According to the invention, particularly good results are generally also attained with regard to ballistic protection when the knitted textile fabric 3 is in the form of a weft-knitted fabric produced with independently-movable needles and/or is formed as a weft-knitted fabric produced with independently-movable needles.

A plain construction has only reverse loops on one side and only face loops on the other side. A reverse loop side is characterized in that at the lower points of intermeshing the loop feet are above and the loop legs below the head of the preceding loop. By contrast, a face loop side is characterized in that at the lower points of intermeshing the feet are below and the legs above the head of the preceding loop. A rib structure has face loops on both sides of the fabric while the purl structure has predominantly reverse loops on both sides of the fabric.

In principle, the knitted textile fabric 3 may also be produced on a circular or flat-bed knitting machine with independently-movable needles and/or as warp-knitted fabric, or warp knit, and/or as weft-knitted fabric, or weft knit, produced with fixed needles, in particular as noted above.

As depicted in FIG. 1 A and FIG. 1 B, the invention may provide with regard to the formation of the knitted textile fabric 3 that the structural element 3*b* is selected from the group of tuck loop, float, inlay, partial insertion and filler thread, preferably tuck loop and float. More particularly, the structural element 3*b* may take the form of a float and/or of a tuck loop. In this context, FIG. 1 A shows the formation of the structural elements in the form of floats, while FIG. 1 B shows the formation of the structural elements in the form of tuck loops. By using specific structural elements 3*b*, the applicant found that, completely surprisingly, the mechanical stability and/or integrity of the knitted textile fabric 3 is further improved, entailing a further enhancement in ballistic-protective performance.

Regarding the ultra high molecular weight polyethylene (UHMW-PE) employed in the present invention to form the fragment protection elements 2 and/or the knitted textile fabric 3 underlying the fragment protection elements 2, it is preferable for the purposes of the present invention for the ultra high molecular weight polyethylene (UHMW-PE) to be present as yarn and/or thread and/or strand, preferably filament yarn, in particular to form and/or as constituent part of the knitted textile fabric 3 of the particular fragment protection elements 2, preferably to form the loops 3*a* and/or the structural elements 3*b*, preferably the loops 3*a* and the structural elements 3*b*, of the knitted textile fabric 3 of the particular fragment protection elements 2. The use of yarns is generally preferable for the purposes of the present invention. Filament yarns moreover are notable for a particularly high level of strength, entailing a further improvement of ballistic-protective properties.

The present invention may provide in principle that the needle loops 3*a* and/or the structural elements 3*b* are each independently formed from a yarn/thread/strand, preferably filament yarn. It may similarly also be provided that needle loops 3*a* and/or the structural elements 3*b* are each independently formed from at least two yarns and/or at least two threads and/or at least two strands, preferably filament yarns.

In this context, the particular yarns/threads/strands may each consist of the same material. It is similarly also possible in the context of the present invention for the particular yarns/threads/strands to consist of mutually different materials, in which case the materials adduced hereinafter in respect of the knitted textile fabric 3 are employable in this regard. Further material-related properties may thereby be provided in a precise manner, for example with regard to the provision of fire- and/or flame-retardant properties or the like.

The present invention may further provide that the yarn and/or the thread and/or the strand, in particular the filament yarn, includes a plurality of (individual) filaments. In this context, the yarn and/or the thread and/or the strand, in particular the filament yarn, may include or consist of at least two, especially at least three and preferably at least four (individual) filaments and up to 800 (individual filaments). In addition, the (individual) filaments may each independently have a diameter in the range from 5 μm to 50 μm, in particular from 6 μm to 40 μm, preferably from 8 μm to 30 μm, more preferably from 10 μm to μm.

In this context, a high number of filaments leads to a further enhancement of ballistic stability. More particularly, a high number of filaments in the yarn leads to a further stabilization of the material produced therefrom, in particular—without wishing to be tied to this theory—since impacting kinetic energy can be absorbed and removed to an improved degree, serving to improve the stopping of penetrating objects in the form of fragments.

The present invention may further provide that the yarn and/or the thread and/or the strand, in particular the filament yarn, is twisted in the Z-direction or in the S-direction, preferably in the Z-direction. In particular, at a yarn, thread and/or strand twist in the range from 50 T/m to 180 T/m (turns per meter), preferably from 60 T/m to 150 T/m, preferably from 70 T/m to 125 T/m, more preferably from 75 T/m to 110 T/m. In this context, the applicant found that, completely surprisingly, the above-recited ranges regarding the twist lead to an optimization of ballistic-protection properties, in particular since it is also on this basis—without wishing to be tied to this theory—that an optimized transportation of energy and/or an optimal distribution of kinetic energy imported by the impact of fragments is ensured.

The yarn employed for the knitted textile fabric 3 and/or the thread and/or strand in this regard, particularly based on ultra high molecular weight polyethylene (UHMW-PE), should additionally have the following properties for the purposes of the present invention:

- In particular, the yarn and/or the thread and/or the strand, in particular the filament yarn, should have a linear density in the range from 50 to 500 dtex, in particular from 75 to 450 dtex, preferably from 100 to 400 dtex, more preferably from 110 to 300 dtex.
- In addition, the yarn and/or the thread and/or the strand, in particular the filament yarn, should have a diameter in the range from 4 μm to 250 μm, in particular from 6 μm to 200 μm, preferably from 8 μm to 150 μm, more preferably from 10 μm to 100 μm.
- Similarly, the yarn and/or the thread and/or the strand, in particular the filament yarn, should have a tenacity in the range from 2 N/tex to 8 N/tex, in particular from 2.5 N/tex to 6 N/tex, preferably from 3 N/tex to 5 N/tex.
- The invention may additionally provide that the yarn and/or the thread and/or the strand, in particular the filament yarn, has an elasticity modulus in the range from 50 N/tex to 300 N/tex, in particular from 75 N/tex to 250 N/tex, preferably from 100 N/tex to 200 N/tex.
- The yarn and/or the thread and/or the strand, in particular the filament yarn, should additionally have a breaking extension in the range from 0.5% to 10%, in particular from 1% to 8%, preferably from 1.5% to 6%, more preferably from 2% to 5%, yet more preferably from 3% to 4%.
- Similarly, the yarn and/or the thread and/or the strand, in particular the filament yarn, should have a density in the range from 800 kg/m$^3$ to 1200 kg/m$^3$, in particular from 800 kg/m$^3$ to 1200 kg/m$^3$, preferably from 850 kg/m$^3$ to 1100 kg/m$^3$, more preferably from 900 kg/m$^3$ to 1050 kg/m$^3$, yet more preferably from 950 kg/m$^3$ to 1000 kg/m$^3$.
- In addition, the yarn and/or the thread and/or the strand, in particular the filament yarn, should have a crystallinity in the range from 70% to 95%, in particular from 75% to 90%, preferably from 80% to 85%. In particular, the yarn and/or the thread and/or the strand, in particular the filament yarn, should have a crystallinity of at most 95%, in particular at most 90%, preferably at most 85%. The crystallinity values relate in particular to the underlying ultra high molecular weight polyethylene (UHMW-PE).

The present invention may further provide that knitted textile fabric 3 is endowed with at least one further material, in particular yarn and/or thread and/or strand, other than ultra high molecular weight polyethylene (UHMW-PE). In particular, the yarn and/or the thread and/or the strand, in particular the filament yarn, may be endowed with at least one further material, in particular filament, other than ultra high molecular weight polyethylene (UHMW-PE), in particular to form antimicrobial and/or biostatic, elastic, hydrophilic, fire-resistant and/or flame-resistant properties. Thus, the knitted textile fabric 3 may include at least one material other than ultra high molecular weight polyethylene (UHMW-PE), particularly in the form of a yarn and/or thread and/or strand, in particular filament yarn.

In this context, the material, in particular the yarn and/or the thread and/or the strand or the filament, other than ultra high molecular weight polyethylene (UHMW-PE) is selected from the group of natural products and synthetic products, in particular silk, cotton, wool, linen, elastane, modacrylic, aramid, in particular meta-aramid, and mixtures thereof. The content of material, in particular in the form of yarn and/or thread and/or strand or filament, other than ultra high molecular weight polyethylene (UHMW-PE) may be in the range from 1 wt % to 60 wt %, in particular from 2 wt % to 55 wt %, preferably from 5 wt % to 50 wt %, more preferably from 10 wt % to 40 wt %, based on the knitted textile fabric 3.

With regard to the yarns/threads/strands employed according to the present invention that are based on ultra high molecular weight polyethylene (UHMW-PE), commercially available products are employable. It is more particularly possible to employ corresponding products available under the designation Dyneema®. It is additionally also possible to employ products commercially offered for sale under the designation SPECTRA® 2000.

It is additionally advantageous for the purposes of the present invention when the knitted textile fabric 3 is endowed with material, in particular yarn and/or thread and/or strand, other than ultra high molecular weight polyethylene (UHMW-PE) to form mutually different (major) areas and/or surfaces of the knitted textile fabric 3. In particular, the knitted textile fabric 3 may have mutually different (major) areas and/or surfaces. In this context, the knitted textile fabric 3 may include the ultra high molecular weight polyethylene (UHMW-PE) at least essentially on the (major) area facing the wearer in the donned state and/or on the inside area of the knitted textile fabric 3. The knitted textile fabric 3 may additionally include the material other than ultra high molecular weight polyethylene (UHMW-PE), in particular meta-aramid, at least essentially on the (major) area facing away from the wearer in the donned state and/or the outside area of the knitted textile fabric 3.

Endowing the knitted textile fabric 3 with specific (material-related) properties, such as, in particular, antimicrobial/biostatic, hydrophilic, fire-resistant and/or flame-resistant properties, may also be effected via application of corresponding substances which for this purpose are well known to a person skilled in the art, for example by spraying, dipping or the like. More particularly, a surface modification via plasma treatment or the like is also a possibility. For example, on the basis of the aforementioned methods in particular, the knitted textile fabric 3 may also be endowed with oleophobic and/or oleophilic properties in a precise manner.

The term "inside area" here relates particularly to that area of the knitted textile fabric 3 which in the donned state faces the wearer, while the term "outside area" relates particularly to that side of the knitted textile fabric 3 which in the donned state faces away from the wearer.

Thereby it is possible to provide additional, material-specific properties that complement the fragment protection, such as fire/flame-resistant properties and/or a specific coloration/camouflaging of the material, in which case side/surface-specific properties are realizable in this connection, and that without degrading the ballistic-protective function to any significant extent. The production of such materials in the form of a knitted fabric 3 having mutually different surficial properties on the basis of using different yarns, threads or strands, is realizable in a manner known per se to a person skilled in the art, for example by employing circular weft-knitting machines with independently-movable needles to form a specific type of needle-loop construction or the like.

The properties of the knitted textile fabric 3 are also altogether open to be varied/custom-tailored via the needle-loop construction chosen for the underlying weft knit produced with independently-movable needles. In particular, it is possible to increase the yarn, thread and/or strand thickness or employ a multiple type of yarn, thread and/or strand system in order, for example, to further densify the sheet structure. As noted above, it is possible to use two or more yarns, threads and/or strands made of different base materials. It is additionally also possible to use additional plating strands.

On the basis of the aforementioned measures, for example, the clothing physiology and/or the ballistic-protective properties are also improvable in a specific manner and, moreover, the material may be endowed with fire/flame-retardant properties for example.

As noted above, yarns/threads/strands based on modacrylic and/or meta-aramid are employable in order to optimize the flame and heat resistance. Moreover, wool and/or cotton yarns and/or threads and/or strands are employable in order to improve the ability to adsorb moisture/perspiration and/or to provide an additional form of thermal insulation.

It is advantageous for the purposes of the present invention when the knitted textile fabric 3 takes the form of a two-dimensional textile sheet material. In addition, the knitted textile fabric 3 should have a basis weight in the range from 75 g/m$^2$ to 700 g/m$^2$, particularly from 100 g/m$^2$ to 600 g/m$^2$, preferably 125 g/m$^2$ to 500 g/m$^2$, more preferably from 150 g/m$^2$ to 400 g/m$^2$. This ensures a high wearing comfort coupled with a high level of protective function against the penetration of fragments.

In particular, the knitted textile fabric 3 should be gas/air permeable. The knitted textile fabric 3 should preferably have an air transmission rate, determined to DIN ISO 9237, of at least 1000 l/m$^2$·min, preferably at least 2000 l/m$^2$·min, more preferably at least 3000 l/m$^2$·min, yet more preferably at least 4000 l/m$^2$·min, most preferably at least 5000 l/m$^2$·min.

It may similarly be provided according to the present invention that the knitted textile fabric 3 is water vapor permeable. In addition, the knitted textile fabric 3 should have a water vapor transmission rate at 20° C. of at least 20 l/m$^2$ per 24 h, in particular 30 l/m$^2$ per 24 h, preferably at least 40 l/m$^2$ per 24 h, more preferably at least 50 l/m$^2$ per 24 h. The water vapor transmission rate may be measured in particular by the inverted cup method of ASTM E 96 and at 20° C. (regarding further details concerning the measurement of water vapor transmission cf. also McCullough et al. "A comparison of standard methods for measuring water vapour permeability of fabrics" in *Meas. Sci. Technol.* [*Measurements Science and Technology*] 14, 1402-1408, August 2003). This ensures a particularly high wearing comfort, since perspiration is removed in an effective manner.

In this context, the knitted textile fabric 3 may additionally have a water vapor transmission resistance $R_t$ under steady-state conditions at 20° C. of at most 20 (m$^2$·pascal)/watt, in particular at most 15 (m$^2$·pascal)/watt, preferably at least 10 (m$^2$·pascal)/watt, more preferably at most (m$^2$·pascal)/watt. The water vapor transmission resistance $R_t$ may be measured in particular to DIN EN 31 092:1993 or the identical international standard ISO 11092 of February 1994 ("Textiles—Physiological Effects, Measurement of Thermal and Water-Vapor Resistance Under Steady-State Conditions (sweating guarded-hotplate test)").

In general, the knitted textile fabric 3 should have a thickness in the range from 0.05 mm to 50 mm, in particular from 0.1 mm to 25 mm, preferably from 0.2 mm to 15 mm, more preferably from 0.3 mm to 10 mm, even more preferably from 0.4 mm to 5 mm, most preferably from 0.5 mm to 3 mm.

A preferred embodiment of the present invention may provide that the knitted textile fabric 3 has rib-shaped elevations, preferably longitudinal ribs, on the (major) area facing the wearer in the donned state and/or on the inside area of the knitted textile fabric and/or on the (major) area facing away from the wearer in the donned state and/or on the outside area. In particular, the rib-shaped elevations, in particular the longitudinal ribs, can extend and/or be arranged in at least essentially straight lines and/or parallel to each other. These rib-shaped elevations may be formed in particular in the course of the production of the knitted textile fabric 3 on the basis of a specific needle-loop construction. The corresponding methods of production are well known to a person skilled in the art, so no further exposition is required in this regard.

Regarding the knitted textile fabric 3 as such and/or the fragment protection elements 2 including/consisting of said knitted textile fabric 3, it and they have further positive properties benefiting not only the wearing comfort but also the provision of an effective form of fragment protection function. This is because the fragment protection elements 2 and/or the respective knitted textile fabrics 3 have altogether hydrophilic properties which score a grade of 5 on the so-called TEGEWA test (featuring a rating scale from 1=lowest hydrophilicity to 6=highest hydrophilicity). It follows from this that the materials are capable of taking up and/or transferring out perspiration in a very efficient manner, specifically without feeling moist throughout even a prolonged period of wear. In addition, the underlying materials are antimicrobial/biostatic to ASTM E-2149-C and also perspiration-fast to DIN EN ISO 105-E04. Furthermore, the materials are at least essentially inert to ammonia (urine). The materials employed for the purposes of the present invention further evince a high degree of launderability, in that even after 20 washing cycles at a temperature of 60° C. there is no significant impairment to the material. In this connection, the materials also have short drying times and, what is more, are certified to ECO-TEX (product class II, i.e., products in direct contact with the skin). Furthermore, the materials are altogether thermally stable in that even after storage at 70° C. for 24 hours there is no sustained impairment to the materials' properties.

Owing to the outstanding properties of the materials employed for the fragment protection elements 2 there is no need—in fundamental contradistinction to the prior art, where para-aramids are chiefly employed as yarn, thread and/or fiber system in order to ensure a certain level of protective function—to insert/seal the materials providing ballistic-type fragment protection function into air- and/or water-impermeable and/or UV-nontransmitting foils, because this is associated in the prior art with the serious disadvantages of an excessively rapid temperature increase for and/or overheating of the wearer, forcing excessive perspiring. The materials in the form of knitted textile fabric 3 which are employed for the fragment protection elements 2 in the manner of the present invention, by contrast, as noted above, have outstanding physiological properties in that, owing to the air permeability and hydrophilicity of the materials, any temperature increase and/or overheating is controlled, particularly since perspiration is, in an effective manner, taken up and conducted away by the material. The positive wearing comfort is also augmented by the altogether cool haptics of the material.

Figure 3A:
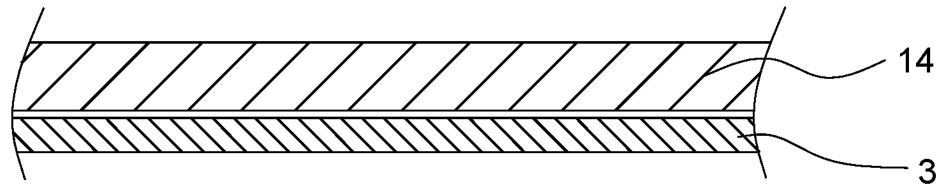
FIG. 3 A shows a cross-sectional depiction of a protective apparel unit and/or a fragment protection element of single-plied construction and with a complementing textile covering material.

As depicted in FIG. 3A, the fragment protection elements 2 may each independently include or consist of one ply of the knitted textile fabric 3. As further regards the fragment protection elements 2, these can each independently include a plurality of plies of the knitted textile fabric 3, in particular as defined above. In this connection, the fragment protection elements 2 may have two, three, four, five, six, seven, eight or more plies of the knitted textile fabric 3. Here, the particular plies of the knitted textile fabric 3 can be arranged in stack form and/or plane parallel to each other. Fragment protection is further improved and/or specifically enhanced in this manner. A multi-ply construction of fragment protection elements is suitable in particular for those fragment protection elements 2 that are attachable to and/or importable into the protective apparel unit 1 of the present invention (i.e., are fragment protection elements 2 bonded to the protective apparel unit 1 in a releasable/removable/detachable manner), as described hereinafter. This is a way to provide precise enhancement of fragment protection for particularly at-risk regions of the body.

In this context, the particular plies of knitted textile fabric 3 may be loosely stacked atop each other. For the purposes of the present invention, however, it is advantageous for at least some of the plies, and preferably all the plies, of knitted textile fabric 3 to be bonded to each other in a specifically durable manner. An edge-sided bond in particular is suitable in this regard. The bonding between the particular plies of knitted textile fabric 3 may be effected in a manner known per se to a person skilled in the art, for example by sewing, welding, tacking, adhering or the like, preferably by stitching, for example in the form of flat seams or the like. The present invention may provide for this that, in this context, the plies of the knitted textile fabric 3 are bonded, in particular sewn, to each other, in particular edge-sidedly and/or linearly along the (major) areas of the particular plies.

With regard to the multi-plied construction of fragment protection elements 2, the present invention may similarly provide that at least two specifically successive plies of the knitted textile fabric 3 are arranged and/or aligned twisted relative to each other, in particular at an angle in the range of 45° to 90°, preferably at an angle of 90°, relative to the (major) areas of the particular plies and/or relative to the alignment of the knitted stitches underlying the knitted fabric 3 and/or relative to the rib-shaped elevations on the particular plies of the knitted fabric 3. In this context, therefore, an arrangement of the particular plies in cross-ply with regard to the direction of the knitted stitches (in the form of courses in warp-knitted fabric for example) and/or with regard to the above-described rib-shaped elevations in the knitted textile fabric 3 is particularly advantageous. This further improves functionality in relation to the provision of fragment protection. A corresponding approach may be adopted, for example, in the case of a weft-knitted fabric produced with independently-movable needles.

One embodiment of the present invention may provide that the fragment protection elements 2 are each independently a specifically integral constituent part of the protective apparel unit 1. In this context, the fragment protection elements 2 may be bonded firmly and/or durably (i.e., permanently) to the protective apparel unit 1 and/or be (firmly) integrated therein. The bonding of the particular fragment protection elements 2 may be effected here for example by sewing, welding, tacking, adhering or the like, preferably by sewing, for example on the basis of flat seams. In this embodiment, the fragment protection elements 2 are, as it were, an integral and permanent constituent part of protective apparel unit 1 particularly when the fragment protection elements 2 within the protective apparel unit 1 are firmly bonded to each other and to other materials of the protective apparel unit 1.

Particularly with regard to the fragment protection elements 2 bonded firmly and/or durably (permanently) to the protective apparel unit 1, a preferred embodiment of the present invention may provide that the fragment protection elements 2 form a specifically single-plied and/or specifically single-layered (basal) area of the protective apparel unit 1. When a plurality of plies of the knitted textile fabric 3 are used for the particular fragment protection elements 2, the (basal) area may correspondingly evince a plurality of layers/planes in the region formed by the fragment protection elements 2.

In this embodiment, therefore, specifically the fragment protection elements bonded firmly/durably to the protective apparel unit 1 are arranged sheetlike relative to each other in a or one plane, while more particularly there is an arrangement of the fragment protection elements 2 which is assigned portionally and/or to certain bodily regions/areas of the wearer.

A further embodiment of the present invention may additionally provide that the fragment protection elements 2 are each independently bonded releasably and/or removably and/or detachably to the protective apparel unit 1. In this context, the fragment protection elements 2 may each be independently attachable/importable into accommodation devices 4, in particular accommodation pockets, in the protective apparel unit 1. In this context, the securement of the fragment protection elements 2 to the protective apparel unit 1 may be effected, for example, by accommodation/integration into the accommodation device 4 and/or by additional securing means, such as hook and loop fasteners, zippers or the like. The accommodation devices 4, in particular accommodation pockets, may be formed of a specifically mesh/net-like textile sheet material, in which case mesh fabrics and nettings, respectively, which are known per se to a person skilled in the art are employable for this purpose. Having regard to the detachable fragment protection elements 2 in particular, it is also possible to use a plurality of plies of the knitted textile fabric 3.

On this basis, by using additional fragment protection elements 2, an individual enhancement of the fragment protection properties can be effected, particularly for certain bodily regions of the wearer (particularly a body region having high physiological relevance and/or a high risk of injury in the event of fragment penetration). The precise use of additional fragment protection elements 2 of the aforementioned kind allows for further enhancement in the employment of the adaptive/adaptable fragment protection of the protective apparel unit 1 according to the present invention.

It is further preferable for the purpose of the present invention when the protective apparel unit 1 includes at least one further textile sheet material 5. The present invention may provide in this context that the further textile sheet material 5 combines with the fragment protection elements 2 to form a specifically single-plied and/or single-layered (basal) area of the protective apparel unit 1. It may similarly be provided that the further textile sheet material 5 is bonded, specifically sewn, to the fragment protection elements 2, in particular in each case edge-sidedly, preferably edge-sidedly overlappingly. Individual elements of the textile sheet material 5 may also be bonded to each other in a corresponding manner.

The further textile sheet material may thus preferably be disposed with the particular fragment protection elements 2 in a or one conjoint plane, and/or it combines with the corresponding fragment protection elements 2 to form an uninterrupted area. In this context, the fragment protection elements 2 each independently and the further textile sheet material 5 are bonded to each other in a specifically portionwise manner, for example by sewing, in particular on the basis of flat seams.

In this context, the arrangement of the further textile sheet material 5 within the protective apparel unit 1 of the present invention may particularly be such that body portions/regions that are physiologically less relevant and/or have a lower risk of injury are covered by the further sheet material 5 in the donned state. For example, such regions/portions of the body may be covered by the further textile sheet material 5 in the donned state as are already subject to a (corresponding) form of protection due to external protective devices, such as a ballistic-protective vest, so the specific arrangement of fragment protection elements 2 on the one hand and the at least one further textile sheet material on the other can be used in the present invention to realize a form of complementing protection in relation to already existing protective systems.

In this connection, it is possible for example for the region of the chest cage p to be covered by the further textile sheet material 5 in the donned state. A corresponding fragment protection can then be ensured by the wearing of an (external) (fragment-) protective vest in the region of the chest cage (cf. FIG. 2).

The further textile sheet material 5 may be employed to attain, first, the wearing comfort, particularly by virtue of a high air transmission rate on the part of the underlying material, and/or a further improvement in the fit of the protective apparel unit 1 of the present invention, in particular by virtue of the formation of elastic properties in relation to the further textile sheet material 5. For example, the further textile sheet material may also be arranged within the protective apparel unit 1 in the region of the posterior arms in the case of an under- and/or overshirt or in the region of the exterior upper and/or lower legs and also in the region of the exterior knee in the case of an underpant. Particularly an elastic and/or reversibly extensible construction for the further textile sheet material 5 may hereby be used to realize a body-hugging fit, particularly a close fit for the protective apparel unit 1 in the donned state.

The further textile sheet material 5 should in general be gas permeable, in particular air permeable, and/or water vapor permeable. In addition, the further textile sheet material 5 should take the form of a woven, knitted, laid or bonded textile fabric, in particular the form of a knitted fabric. According to the invention it is advantageous here when the further textile sheet material 5 has a basis weight in the range from 50 $g/m^2$ to 800 $g/m^2$, in particular from 60 $g/m^2$ to 500 $g/m^2$, preferably from 70 $g/m^2$ to 300 $g/m^2$, more preferably from 90 $g/m^2$ to 150 $g/m^2$.

In addition, the further textile sheet material 5 should be elastic and/or reversibly extensible. The present invention may provide for this purpose that the further textile sheet material 5 includes at least one elastic and/or reversibly extensible yarn and/or a corresponding fiber and/or at least one elastic and/or reversibly extensible thread and/or strand, in particular on the basis of a synthetic polymeric material, in particular on the basis of a block copolymer having the constituents polyurethane and polyethylene glycol. In particular, the further textile sheet material 5 should contain the elastic and/or reversibly extensible yarn, thread, strand and/or fiber species in an amount in the range from 5 to 30 wt %, in particular from 7 to 25 wt %, preferably from 8 to 20 wt %, based on the textile sheet material 5. More particularly, materials based on elastane, such as Lycra®, are employable in this context.

In a preferred embodiment of the present invention, the further textile sheet material 5 may take the form of mesh fabric and/or netting, in particular with hole sizes ranging from 0.1 mm to 10 mm, in particular from 0.2 mm to 8 mm, preferably from 0.5 mm to 4 mm, more preferably from 1 mm to 3 mm. This serves to further improve the wearing comfort, particularly with regard to a high air and/or water (vapor) transmission rate through the underlying material.

The textile sheet material 5 may additionally include at least one further yarn, thread, strand and/or fiber species. In this context, the further yarn, thread, strand and/or fiber species can be selected from the group of natural products and synthetic products. The further yarn, thread, strand and/or fiber species may be preferably selected from the group of cotton; wool; linen; polyesters; polyolefins, polyvinyl chloride; polyvinylidene chloride; acetate; triacetate;

acrylic; polyamide; polyvinyl alcohol; polyurethanes; polyvinyl esters and also mixtures thereof.

The protective apparel unit 1 of the present invention may in general be present in numerous elaborations/embodiments. In principle, the protective apparel unit 1 may take the form of underwear and/or of outerwear and/or comprise these. More particularly, the protective apparel unit 1 may comprise underwear and/or outerwear as such.

In this context, the present invention may by way of example and in a nonlimiting manner provide that the protective apparel unit 1 take the form of underwear with appropriate fragment protection elements 2, while the protective apparel unit 1 similarly comprises as outerwear (in the form of an overall or the like, for example) a one- or multi-piece suit which may optionally be endowed with further fragment protection elements. In addition, as noted above, the protective apparel unit 1 may comprise further fragment protection elements 2 and/or fragment protection devices 8 to 13 with in turn corresponding fragment protection elements in order, for example, to specifically enhance the level of fragment protection for certain regions of the body, while the further fragment protection devices 8 to 13 may in principle be attachable to and/or importable into the protective apparel unit 1 and/or take the form of releasable and/or removable and/or detachable units.

Figure 2:
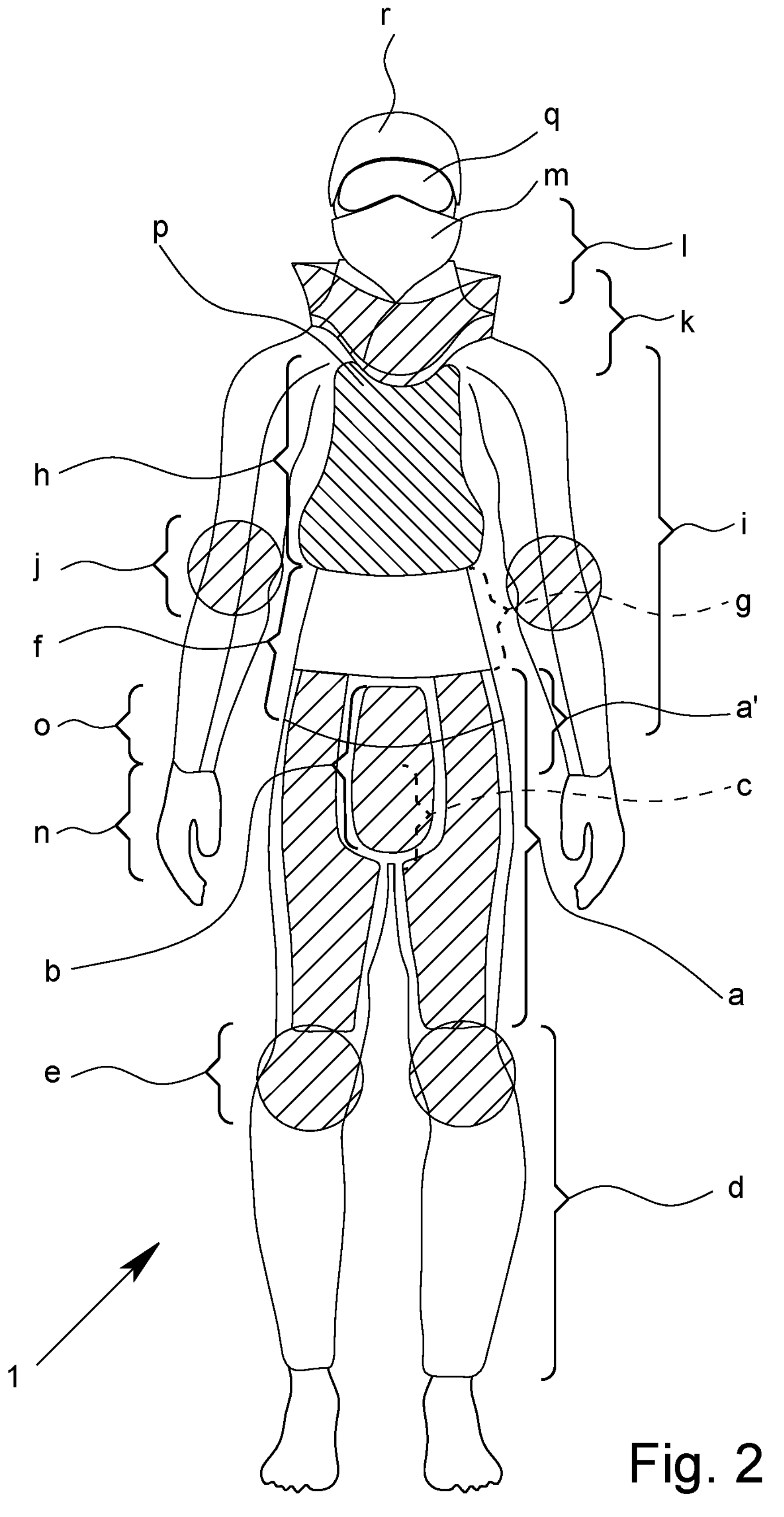
FIG. 2 shows a schematic overview of various bodily regions/portions relevant in relation to providing a protective function against fragments released by explosion/detonation.

As schematically depicted in FIG. 2, the fragment protection elements 2 underlying the protective apparel unit 1 of the present invention may be arranged such that a protection results for various regions and/or body areas that is specific and also adapted to an operational and/or threat situation. Here in principle a differentiation is possible according to the present invention between a basic and/or baseline level of protection (depicted in FIG. 2 as blank areas of the protective apparel unit 1) and an extended (additional) level of protection (depicted in hatched form in FIG. 2). An extended (additional) level of protection may utilize, for example, additional fragment protection elements and/or devices which, more particularly, may be engineered to be additionally attachable and/or incorporable to and/or into the protective apparel unit 1 of the present invention.

In general, as similarly depicted in schematic form in FIG. 2, the fragment protection elements 2 may each independently, in the donned state of protective apparel unit 1, extend over and/or at least partly cover and/or dispose in the region of the thigh a, in particular of the anterior, interior and/or posterior thigh, preferably the anterior and/or interior thigh; of the loin a'; of the genitals b; of the anal and/or perineal region c; of the lower leg d, in particular of the anterior, interior and/or posterior lower leg, preferably the anterior and/or interior lower leg; of the knee and/or of the popliteal cavity e; of the lower abdomen and/or of the urinary bladder tract f; of the lower back and/or of the renal pelvis g; of the torso h, in particular the lateral and/or posterior torso; of the upper and/or lower arm i; of the chelidon and/or of the cubitus j; of the shoulder k; of the neck 1; of specifically the lower part of the face m; of the hand n, in particular the back of the hand; and/or of the wrist o.

The term "partly" as used in the present invention particularly in respect of the coverage, with fragment protection elements, of defined portions of the body is to be understood as meaning in particular that said fragment protection elements 2 cover the underlying bodily regions/portions in the donned state at least portionately and regionally, respectively.

In this context, it is similarly possible according to the present invention for the particular fragment protection elements 2 to also extend over two or more of the aforementioned regions. Moreover, the particular fragment protection elements 2 may also be arranged relative to each other in an overlapping manner.

As FIG. 2 further clarifies, the protective apparel unit 1 of the present invention may in principle be endowed/combined with external means of protection, for example with a fragment-protective vest, particularly for the region of the chest cage and/or of the anterior torso p, with an eye-protective device to cover the eye region q and/or with a (fragment-) protective helmet to cover the top part of the head r.

The constituents employed according to the present invention for the protective apparel unit 1, in particular fragment protection elements 2, accommodation devices 4, textile sheet material 5 and also further fragment protection devices 8 to 13, may each be present in the protective apparel unit of the present invention in duplicate and/or multiplicate form and/or twice, particularly insofar as the particular constituents relate to mutually assigned portions/extremities of the body (e.g., left thigh and right thigh). More particularly, in this case, the components thus assigned may be made symmetrical to each other, particularly in respect of the longitudinal body axis of a wearer (e.g., left and right releasable thigh-type fragment protection element 2*a*'.)

Figure 4A:
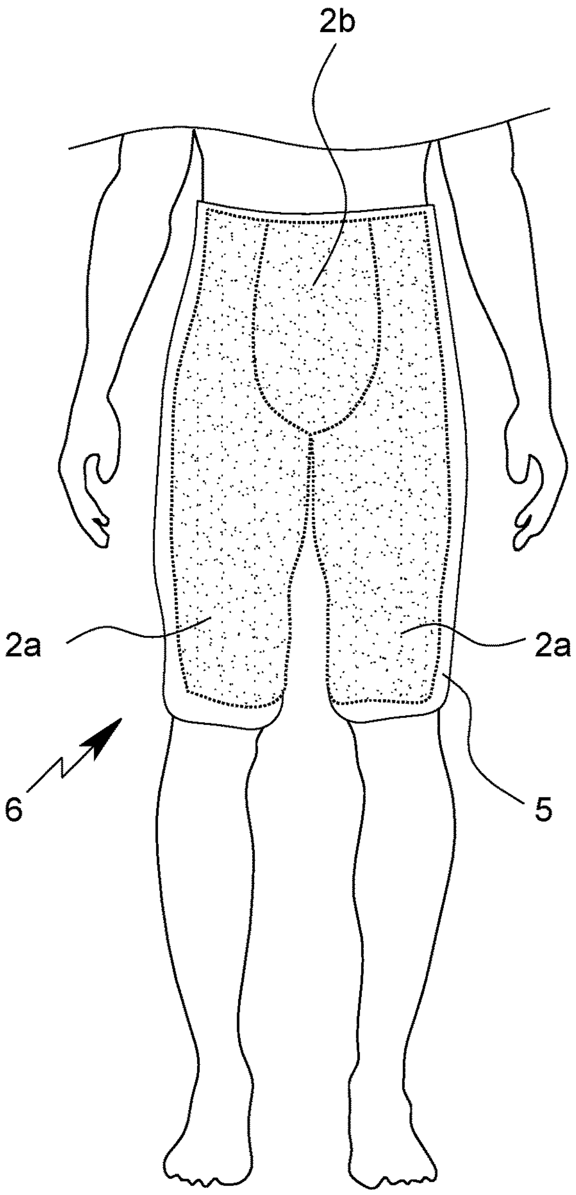
FIG. 4 A shows a schematic depiction giving a frontal plan view of a protective apparel unit of the present invention, according to which the protective apparel unit takes the form of a short-legged underpant having corresponding fragment protection elements integrated in the underpant.
Figure 4B:
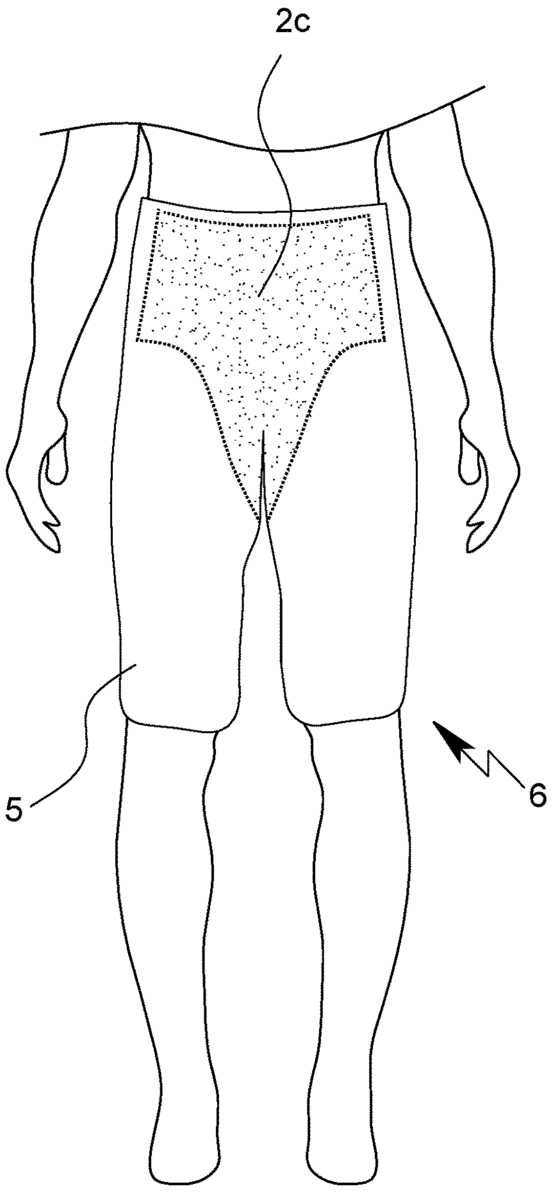
Figure 4C:
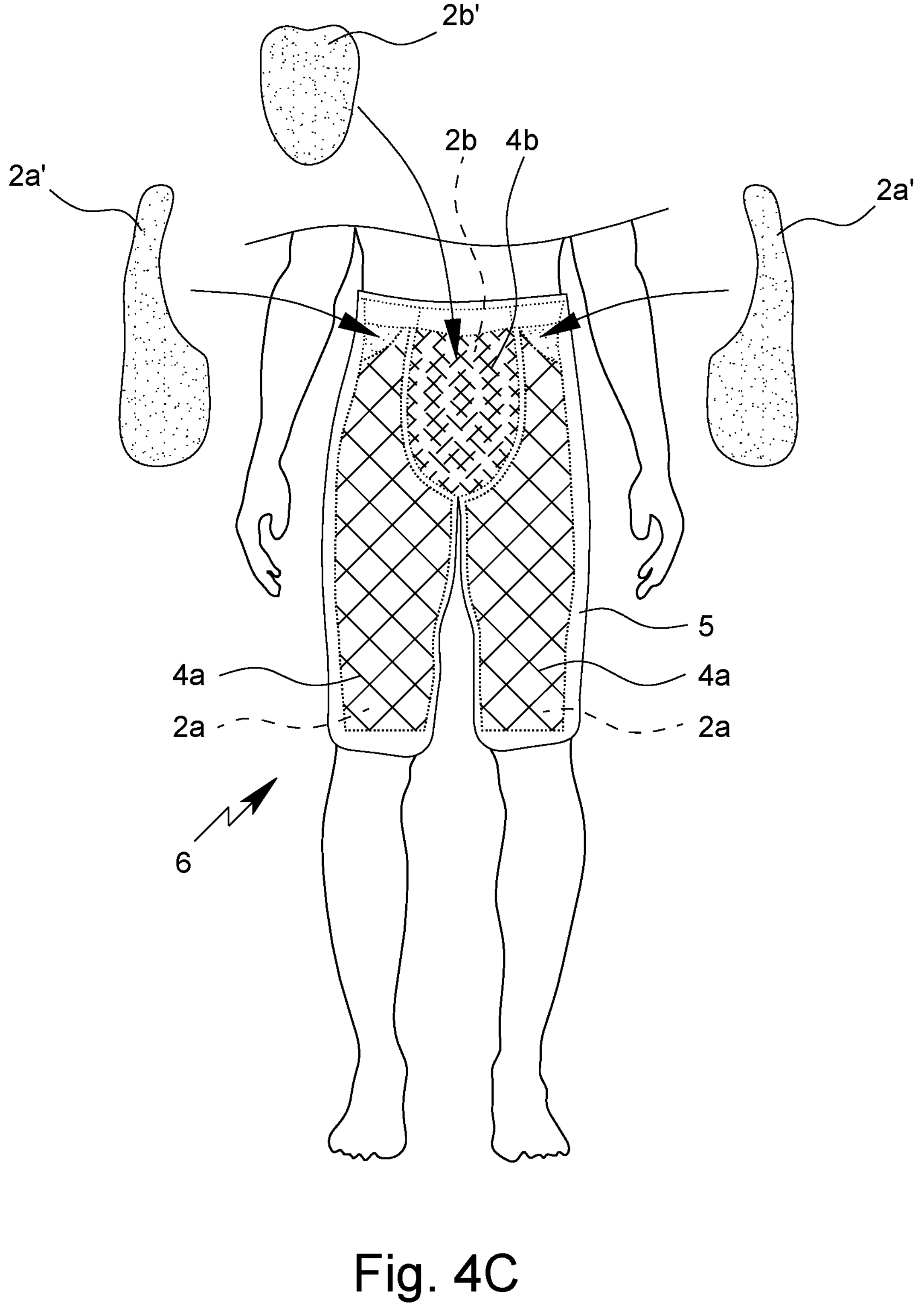
Figure 5A:
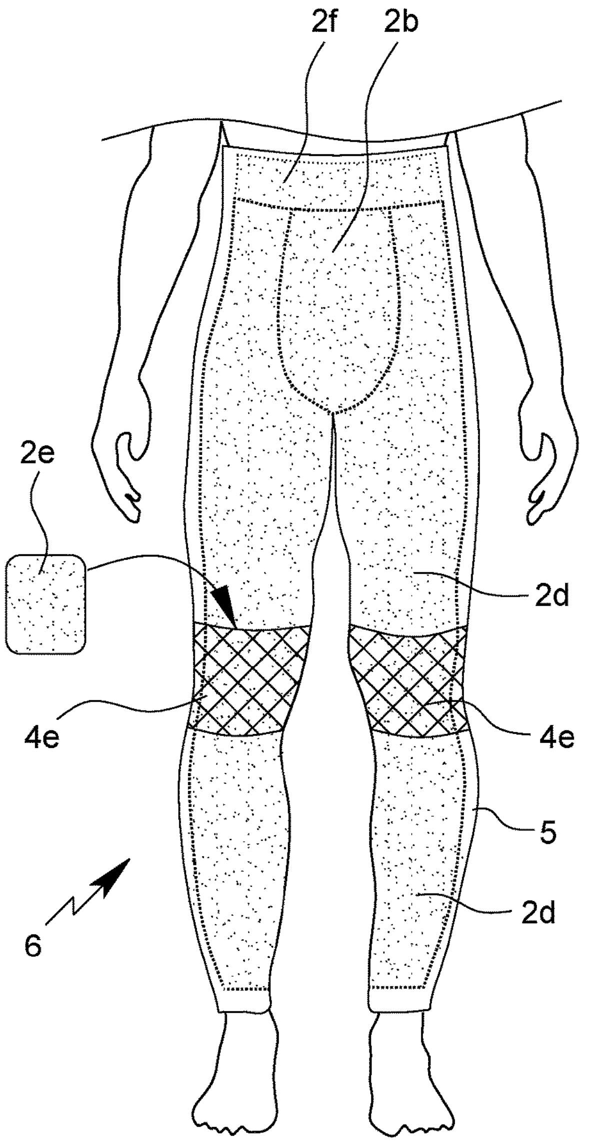
FIG. 5 A shows a schematic depiction giving a frontal plan view of a protective apparel unit of the present invention in the form of a long-legged underpant with corresponding fragment protection elements integrated in the underpant, wherein the underpant further includes additional accommodation devices for accommodating additional fragment protection elements attachable to and/or incorporable in the protective apparel unit of the present invention which are in the form of knee-type fragment protection elements.
Figure 5B:
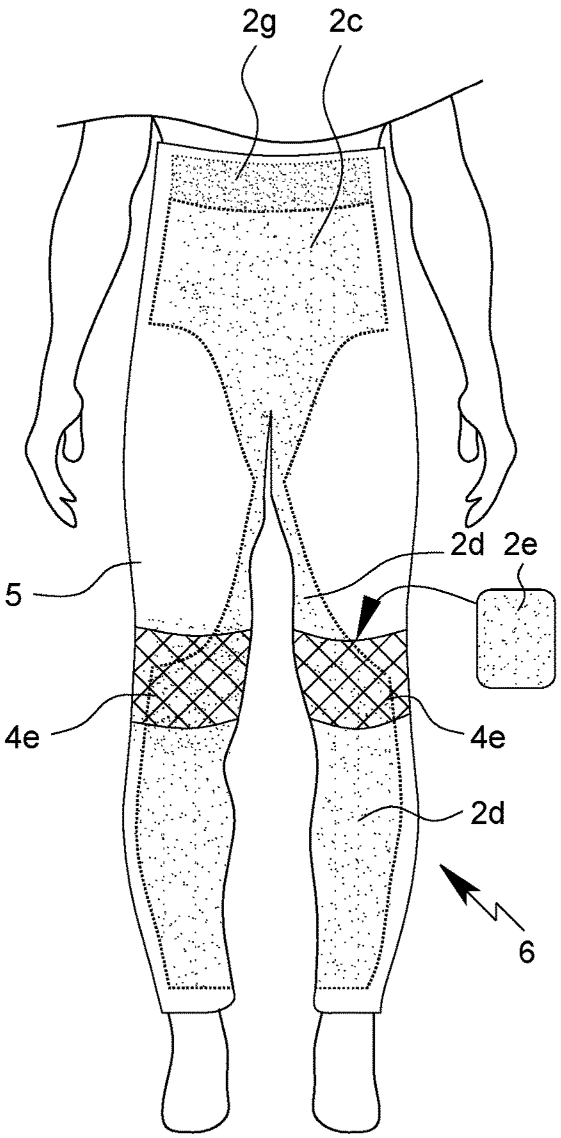

In an embodiment which is preferred according to the present invention, the protective apparel unit 1 according to the invention may comprise an underpant 6, in particular as depicted in, for example, FIG. 4A, FIG. 4B, FIG. 4C and also FIG. 5A and FIG. 5B.

This underpant 6 may in the donned state extend at least partly over the region of the lower extremities and/or at least partly cover the lower extremities. In addition, the underpant 6 may in the donned state extend at least partly over the region of the lower torso and/or of the lower abdomen and/or at least partly cover the lower torso and/or the lower abdomen of a wearer. In this context, the underpant of the present invention should also be designed such that the underpant in its donned state extends and/or covers the genital region, the hip/groin region and also the anal/perineal region.

In a first embodiment of the present invention, the underpant 6 may be such that the underpant 6 in its donned state extends over the thigh region down to the knees. The present invention may here provide that the underpant 6 in its donned state ends above the knee region. In this embodiment of the present invention, the underpant 6 is thus in the form of a short underpant and/or in the form of shorts (FIGS. 4A, 4B and 4C). In a further alternative embodiment, the underpant 6 in its donned state may extend over the thigh region, the knee region and the lower leg region. In this regard, the underpant 6 in its donned state may end above the foot region and/or in the region of the ankle. Accordingly, in this alternative embodiment, the present invention comprises a long underpant which in its donned state, covers the legs of the wearer at least essentially completely (FIG. 5A and FIG. 5B).

As depicted in FIG. 4A for the case of a short underpant 6, the present invention may provide that the protective apparel unit 1, in particular the underpant 6, includes at least one fragment protection element 2*a*, preferably two fragment protection elements 2*a*. In this context, the fragment protection element 2*a* in its donned state may extend over and/or at least partly cover the region of the thigh a, in particular the anterior, interior and/or posterior thigh, preferably the anterior and/or interior thigh; and/or of the loin a'.

According to the invention, the fragment protection element 2$a$ may take the form of a thigh-type fragment protection element. Thus, according to the present invention, the fragment protection element 2$a$ may take the form of a thigh-type fragment protection element. More particularly, a thigh-type fragment protection element may be provided for the right leg of a wearer and a thigh-type fragment protection element for the left leg of a wearer.

As similarly depicted in FIG. 4A for the case of a short underpant and in FIG. 5A for the case of a long underpant, the protective apparel unit 1, in particular the underpant 6, may include at least one fragment protection element 2$b$. In particular, the fragment protection element 2$b$ may in its donned state extend over and/or at least partly cover the region of the genitals b; and/or of the anal and/or perineal region c, in particular the region of the genitals b. In particular, the fragment protection element 2$b$ may take the form of a genital-type fragment protection element.

As additionally depicted in FIG. 4B (short underpant) and also in FIG. 5B (long underpant), the protective apparel unit 1, in particular the underpant 6, may include at least one fragment protection element 2$c$. In this context, the fragment protection element 2$c$ may in its donned state extend over and/or at least partly cover the region of the anal and/or perineal region c and/or of the genitals b, in particular the region of the anal and/or perineal region c. In particular, the fragment protection element 2$c$ may take the form of an anal/perineal region type fragment protection element.

Particularly for the case where the underpant 6 underlying the protective apparel unit 1 of the present invention takes the form of a long-legged underpant, the present invention may provide that the protective apparel unit 1, in particular the underpant 6, includes at least one fragment protection element 2$d$, preferably two fragment protection elements 2$d$. For this case, the fragment protection element 2$d$ may in its donned state extend over and/or at least partly cover the region of the thigh a, in particular the anterior, interior and/or posterior thigh, preferably the anterior and/or interior thigh; and/or of the loin a'; and/or of the lower leg d, in particular of the anterior, interior and/or posterior lower leg, preferably the anterior and/or interior lower leg; of the knee and/or of the popliteal cavity e. In particular, the fragment protection element 2$d$ may take the form of a leg-type fragment protection element.

In general, it may additionally be provided in relation to the protective apparel unit 1 of the present invention that the protective apparel unit 1, in particular the underpant 6, includes at least one fragment protection element 2$f$. This fragment protection element 2$f$ may in its donned state extend over and/or at least partly cover the region of the lower abdomen and/or of the urinary bladder tract e. In particular, the fragment protection element 2$f$ may take the form of a bladder/urinal tract-type fragment protection element. In this context, the fragment protection element 2$f$ may be bonded to the fragment protection elements 2$a$ and/or 2$d$ and/or the fragment protection element 2$b$ in a specifically edge-sided manner.

In this context, the protective apparel unit 1 of the present invention, in particular the underpant 6, may additionally include at least one fragment protection element 2$g$. This fragment protection element 2$g$ may in its donned state extend over and/or at least partly cover the region of the lower back and/or of the renal pelvis g. In this context, the fragment protection element 2$g$ may take the form of a renal pelvis type fragment protection element. The fragment protection element 2$g$ may be bonded to the fragment protection element 2$c$ in an edge-sided manner in particular.

The aforementioned fragment protection elements 2$f$ and 2$g$ may for the purposes of the present invention be provided not only in the case of the short-legged underpant but also in the case of the long-legged underpant. The use of said fragment protection elements 2$f$ and 2$g$ thus extends the fragment protection particularly to the lower region of the back and abdomen, respectively.

The above-adduced fragment protection elements 2$f$ and 2$g$ are similarly depicted in FIG. 5A and FIG. 5B respectively.

It may additionally be provided according to the present invention that the protective apparel unit 1, in particular the underpant 6, includes at least one further textile sheet materials, in particular as defined above. This may concern in particular an elastic and/or reversibly extensible further textile sheet material, in particular as defined above. Owing to the specific properties of the further textile sheet material and of the specific arrangement along so to speak the external portion of the leg, the fit and hence the wearing comfort of the underpant is improved, in particular with regard to the underpant closely hugging the body of the wearer.

In a further embodiment of the present invention, the underpant may additionally be provided waist and/or leg cuffs, in which case elastic and/or reversibly extensible materials are employable in this regard.

As noted above, the concept of the present invention provides precise (i.e., site-specific in particular) enhancement of the fragment protection function via additional fragment protection elements 2, in that the additional fragment protection elements 2 are positioned in the protective apparel unit 1 of the present invention such that additional protection is specifically afforded to particularly at-risk regions of the body.

Particularly for this purpose (i.e., the accommodation and/or integration of further fragment protection elements in the protective apparel unit 1 of the present invention), it may be provided that the protective apparel unit 1, in particular the underpant 6, includes at least one accommodation device 4$a$, 4$b$, in particular an accommodation pocket, in particular for accommodating at least one fragment protection element 2$a'$/2$b$ bonded releasably and/or removably and/or detachably to the protective apparel unit 1, in particular the underpant 6 (cf. FIG. 4C).

In this context, the present invention may provide that the protective apparel unit 1, in particular the underpant 6, includes at least one accommodation device 4$a$, preferably two accommodation devices 4$a$. This accommodation device, as depicted in FIG. 4C, may in its donned state dispose on the wearer-remote (basal) area of the protective apparel unit 1, in particular the underpant 6, and/or the accommodation device 4$a$ may in its donned state extend over and/or at least partly cover the region of the thigh a, in particular the anterior and/or interior thigh, preferably the anterior thigh; and/or of the loin a'. In this connection, the accommodation device 4$a$ may in particular take the form of a thigh protection accommodation device. To this end, the accommodation device 4$a$ may be bonded, in particular sewn, to the underpant 6 edge-sidedly in particular, in which case it is particularly in the upper region of the accommodation device 4$a$ that there may be situated an appropriate opening to accommodate the additional fragment protection element 2$a'$.

According to the present invention, the protective apparel unit 1, in particular the underpant 6, may include at least one fragment protection element 2$a'$ bonded releasably and/or removably and/or detachably to the protective apparel unit 1, in particular the underpant 6, in particular two fragment protection elements 2*a*'. In this context, the fragment protection element 2*a*' may be importable into the accommodation device 4*a*, in particular the thigh protection accommodation device, and/or the fragment protection element 2*a*' may take the form of a releasable/removable/detachable thigh-type fragment protection element, as similarly depicted in schematic form in FIG. 2C. In this context, the additional fragment protection element 2*a*', when imported into the accommodation device 4*a*, preferably extends over the region of the thigh a, in particular the anterior and/or interior thigh, preferably the anterior thigh, and/or the region of the loin a', and/or the fragment protection element 2*a*' may cover the aforementioned regions at least partly. This is a way to provide an additional form of fragment protection to the particularly at-risk region of the anterior thigh and/or loin.

The present invention may further provide that the protective apparel unit 1, in particular the underpant 6, includes at least one accommodation device 4*b*, as depicted in FIG. 4C. This accommodation device 4*b* may in its donned state dispose on the wearer-facing (basal) area of the protective apparel unit 1, in particular the underpant 6. The accommodation device 4*b* may in its donned state extend over and/or at least partly cover the region of the genitals b and/or of the anal and/or perineal region c, in particular the region of the genitals b. In particular, the accommodation device 4*b* may take the form of a genital protection accommodation device.

The present invention, particularly against the background of enhancing the fragment protection properties for the particularly sensitive region of the genitals and/or the anal and/or perineal region if necessary, may provide that the protective apparel unit 1, in particular the underpant 6, includes at least one fragment protection element 2*b*' releasably and/or removably and/or detachably bonded to the protective apparel unit 1, in particular the underpant 6. To this end the fragment protection element 2*b*' may be importable into the accommodation device 4*b*, in particular genital protection accommodation device. In addition the fragment protection element 2*b*' may take the form of a releasable and/or removable and/or detachable genital-type fragment protection element and/or suspensory. FIG. 4C may similarly be referenced in this regard.

The above-adduced protective apparel unit 1 and/or underpant 6, in particular in the form of a long-legged underpant, may further provide that the underpant 6 includes at least one accommodation device 4*e*, preferably two accommodation devices 4*e* (cf. FIG. 5A and FIG. 5B).

This accommodation device 4*e* may in its donned state dispose on the wearer-remote (basal) area of the protective apparel unit 1, in particular the underpant 6. Similarly, the accommodation device 4*e* may in its donned state extend over and/or at least partly cover the region of the knee and/or the popliteal cavity e, preferably the knee. In particular, the accommodation device 4*e* may take the form of a knee protection accommodation device.

To this end, the protective apparel unit 1, in particular the underpant 6, may include at least one fragment protection element 2*e* releasably/removably/detachably bonded to the protective apparel unit 1, in particular the underpant 6, in particular two fragment protection elements 2*e*. This fragment protection element 2*e* should be importable into the accommodation device 4*e*, in particular the knee protection accommodation device. In this context, the fragment protection element 2*e* should take the form of a releasable/removable knee-type fragment protection element. In this way, it is possible to achieve, for the knee region in particular, better protection which is similarly attachable in a manner that is adaptive in relation to the underlying threat situation in particular (cf. FIG. 5A and FIG. 5B).

Figures 6A, 6B:
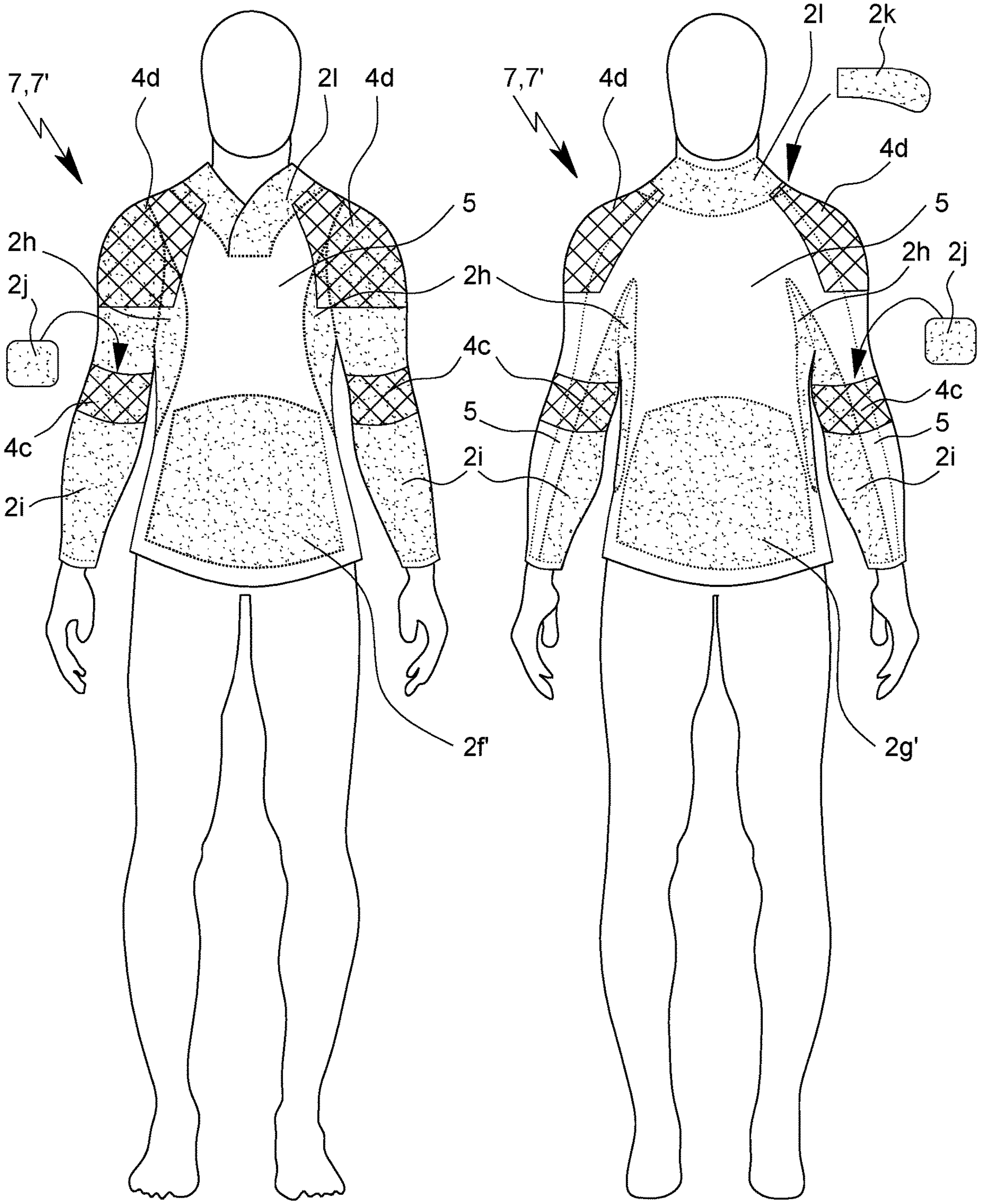
FIG. 6 A shows a schematic depiction giving a frontal plan view of a protective apparel unit of the present invention in the form of an undershirt and/or overshirt with integrated fragment protection elements, wherein the protective apparel unit of the present invention as per this embodiment additionally includes accommodation devices for accommodating additional fragment protection elements attachable to and/or incorporable in the protective apparel unit which are in the form of elbow-type fragment protection elements and shoulder-type fragment protection elements, respectively.

In a further preferred embodiment of the present invention, the protective apparel unit 1 may comprise an undershirt 7 and/or an overshirt 7' (cf. FIG. 6A and FIG. 6B respectively). In this embodiment, the undershirt 7 or the overshirt 7' may in its donned state at least partly extend over and/or cover the region of the upper extremities and/or of the torso and/or of the neck/shoulder region and/or at least partly cover the upper extremities and/or the torso and/or the neck/shoulder region. In particular, the undershirt 7 or the overshirt 7' may in its donned state at least partly extend over and/or at least partly cover the region of the lower abdomen and/or of the urinary bladder tract f; of the lower back and/or of the renal pelvis g; of the torso h, in particular of the lateral and/or posterior torso; of the upper and/or lower arm i; of the chelidon and/or of the cubitus j; of the shoulder h; and/or of the neck 1. According to the present invention, therefore, effective protection may similarly be provided for the region of the upper body with the upper extremities. The undershirt 7 or overshirt 7' is for the purposes of the present invention similarly combinable with the above-described underpant 6 in order that an adaptive form of fragment protection for the (whole) body may be provided on this basis.

In a first embodiment, the undershirt 7 or the overshirt 7' may be formed such that the undershirt 7 or the overshirt 7' in its donned state extends over the upper arm region down to the elbow region. In this context, the undershirt 7 or the overshirt 7' may in its donned state end above the elbow region j. In this embodiment of the invention, therefore, the overshirt or undershirt may take the form of a short-sleeved shirt.

In a second alternative embodiment, the undershirt 7 or the overshirt 7' may in its donned state extend over the upper arm region, the elbow region and the lower arm region. In this regard, the undershirt 7 or the overshirt 7' may in its donned state end above the hand region n and/or in the region of the wrist o. In this alternative embodiment of the present invention, the overshirt or undershirt may so to speak take the form of a long-sleeved shirt.

The protective apparel unit 1, in particular the undershirt 7 or the overshirt 7', may additionally include at least one fragment protection element 2*f*. This fragment protection element 2*f* may in its donned state extend over and/or at least partly cover the region of the lower abdomen and/or of the urinary bladder tract f. The fragment protection element 2*f* may in particular take the form of an abdomen and/or bladder/urinary tract type fragment protection element. FIG. 6A may similarly be referenced in this regard.

In a further embodiment of the present invention, it is advantageous for the protective apparel unit 1, in particular the undershirt 7 or the overshirt 7', to include at least one fragment protection element 2*g*'. This fragment protection element 2*g*' may in its donned state extend over and/or at least partially cover the region of the lower back and/or of the renal pelvis g. In particular, the fragment protection element 2*g*' may take the form of a back and/or renal pelvis type fragment type protection element. FIG. 6B may be referenced in this regard.

As similarly adduced in FIG. 6A and FIG. 6B, the protective apparel unit 1, in particular the undershirt 7 or the overshirt 7', may include at least one fragment protection element 2*h*, preferably two fragment protection elements 2*h*. The fragment protection element 2*h* may in its donned state extend over and/or at least partly cover the region of the torso h, in particular the lateral and/or posterior torso, preferably lateral torso. In particular, the fragment protection element 2*h* may take the form of a torso type fragment protection element.

The present invention may provide, as depicted in FIG. 4A and/or FIG. 4B, that the protective apparel unit 1, in particular the undershirt 7 or the overshirt 7', includes at least one fragment protection element 2*i*, preferably two fragment protection elements 2*i*. In particular, the fragment protection element 2*i* may in its donned state extend over and/or at least partly cover the region of the upper and/or lower arm i; of the chelidon and/or of the cubitus j; and/or of the shoulder h. In particular, the fragment protection element 2*i* may take the form of an arm type fragment protection element.

The present invention may similarly provide that the aforementioned fragment protection elements 2*h* and 2*i* take the form of a conjoint fragment protection element and thus in particular the form of a torso/arm type fragment protection element.

In a further embodiment of the present invention, the protective apparel unit 1, in particular the undershirt 7 or the overshirt 7', may include at least one elbow type fragment protection element, preferably two elbow type fragment protection elements. This elbow type fragment protection element may in its donned state extend over and/or at least partly cover the region of the chelidon and/or of the cubitus j.

In addition, the protective apparel unit 1, in particular the undershirt 7 or the overshirt 7', may include at least one shoulder type fragment protection element, preferably two shoulder type fragment protection elements. This shoulder type fragment protection element may in its donned state extend over and/or at least partly cover the region of the shoulder k.

Similarly, the protective apparel unit 1, in particular the undershirt 7 or the overshirt 7', may include at least one fragment protection element 2*l*. This fragment protection element 2*l* may in its donned state extend over and/or at least partly cover the region of the neck 1. In particular, the fragment protection element 2*l* may take the form of a neck type fragment protection element.

Particularly for the case of the additional use of a ballistic-protective vest, the upper region of the torso, in particular the breast and/or upper region of the back, of the protective apparel unit 1, in particular of the undershirt 7 or of the overshirt 7', may be in principle free of fragment protection elements 2 and/or the protective apparel unit 1, in particular the undershirt 7 or the overshirt 7', may not include any fragment protection elements 2 in the aforementioned places.

It is additionally of advantage for the purposes of the present invention when the protective apparel unit 1, in particular the undershirt 7 or the overshirt 7', includes at least one further textile sheet material 5, in particular as defined above. This further textile sheet material 5 may in its donned state extend over and/or at least partly cover the region of the upper back and/or the region of the chest cage and/or of the upper back and/or the outer hip region and/or the posterior arm region. In respect of the further textile sheet material, this embodiment of the present invention may similarly utilize the above-adduced materials which may in particular be elastic and/or reversibly extensible. This, as noted above, further improves the fit of the protective apparel unit 1 according to the present invention.

In addition, the protective apparel unit 1 of the present invention, in particular the undershirt 7 or the overshirt 7', may include appropriate arm/neck cuffs and/or waist/hip cuffs, in which case elastic materials are similarly possible in this regard, as will in principle be known to a person skilled in the art, so no further exposition is required in this regard.

As similarly depicted in FIG. 6A and FIG. 6B, the present invention may provide that the protective apparel unit 1, in particular the undershirt 7 or the overshirt 7', includes at least one accommodation device 4*c*, in particular an elbow protection accommodation device, preferably two elbow protection accommodation devices. It may here be provided according to the present invention that the elbow protection accommodation device 4*c* in its donned state disposes on the wearer-remote (basal) area of the protective apparel unit 1. In particular, the elbow protection accommodation device 4*c* may in its donned state extend over and/or at least partly cover the region of the cubitus and/or chelidon j. In this context, the accommodation device 4*c* may take the form of an elbow protection accommodation device.

The present invention may particularly in connection with the above embodiment provide that the protective apparel unit 1, in particular the undershirt 7 or the overshirt 7', includes at least one fragment protection element 2*j*, in particular an elbow type fragment protection element 2*j*, releasably and/or removably and/or detachably bonded to the protective apparel unit 1, in particular two elbow type fragment protection elements 2*j'*. In particular, the elbow type fragment protection element 2*j* may be importable into the elbow protection accommodation device 4. In particular, the fragment protection element 2*j* may take the form of a releasable/removable/detachable elbow type fragment protection element 2*j* (cf. FIGS. 6A and 6B).

It may further be provided according to the present invention, as similarly depicted in FIG. 6A and FIG. 6B, that the protective apparel unit 1, in particular the undershirt 7 or the overshirt 7', includes at least one accommodation device 4*d*, in particular a shoulder protection accommodation device, preferably two shoulder protection accommodation devices. This accommodation device 4*d* may in its donned state dispose on the wearer-remote (basal) area of the protective apparel unit 1. In particular, the accommodation device 4*d* may in its donned state extend over and/or at least partly cover the region of the shoulder k. The accommodation device 4*d* may in particular take the form of a shoulder protection accommodation device.

Particularly in connection with the above-adduced embodiment of the present invention, it may also be provided that the protective apparel unit 1, in particular the undershirt 7 or the overshirt 7', includes at least one fragment protection element 2*k*, in particular a shoulder type fragment protection element, releasably/removably/detachably bonded to the protective apparel unit 1, preferably two shoulder type fragment protection elements. This shoulder type fragment protection element 2*k* may be importable into the shoulder protection accommodation device 4*d*. In addition, the fragment protection element 2*k* may take the form of a releasable/removable/detachable shoulder type fragment protection element.

Particularly the overshirt 7' may include an additional textile covering material 14 in the context of the present invention. The covering material 14 may in this connection be arranged in particular on that side which in the donned state faces away from the wearer. This covering material 14 may be flame-resistant and/or have appropriate camouflage. The covering material 14 may similarly have antimicrobial, particularly antibacterial, and/or biostatic properties and also be hydrophilic to further improve the removal of moisture. Reference in this regard may be made to the hereinbelow following definition of covering material 14. A schematic depiction featuring the arrangement of covering material 14 is derivable from FIG. 3A and/or FIG. 3B.

The protective apparel unit 1 of the present invention may further comprise additional/complementing fragment protection devices incorporating corresponding fragment protection elements, which may similarly be additionally attached to the protective apparel unit 1 and/or, as constituent part of protective apparel unit 1, be conjointly wearable therewith. What are concerned here are in particular those additional fragment protection devices which may be worn on particularly exposed and/or at-risk places of the body. This makes it possible to provide where necessary a form of fragment protection which additionally is individually adaptable and also superior. In general, the fragment protection devices may include corresponding fragment protection elements 2, in particular on the basis of the above-defined knitted textile fabric 3.

Figure 7A:
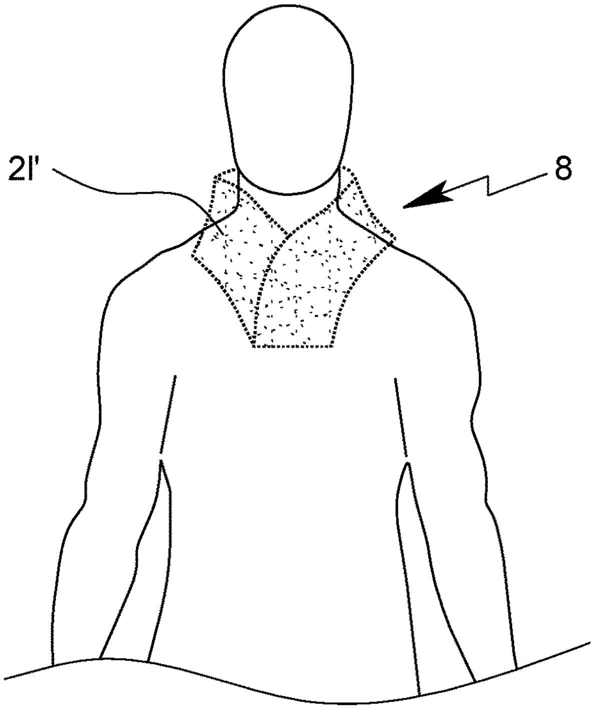
FIG. 7 A shows a schematic depiction giving a frontal plan view of an additional fragment protection device in the form of a fragment protection collar as an optionally further constituent of the protective apparel unit of the present invention to ensure a complementing form of fragment protection.
Figure 7C:
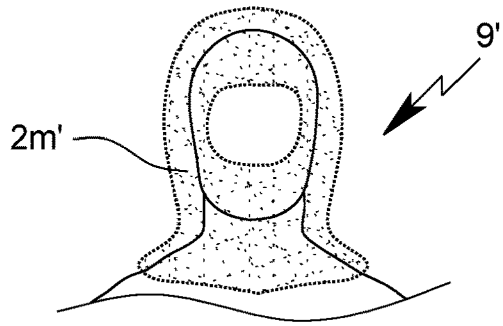
Figure 7B:
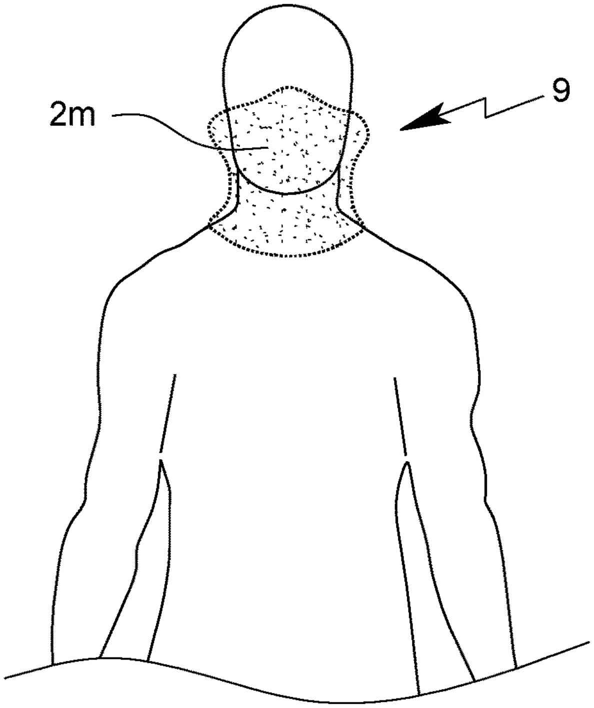
Figure 7D:
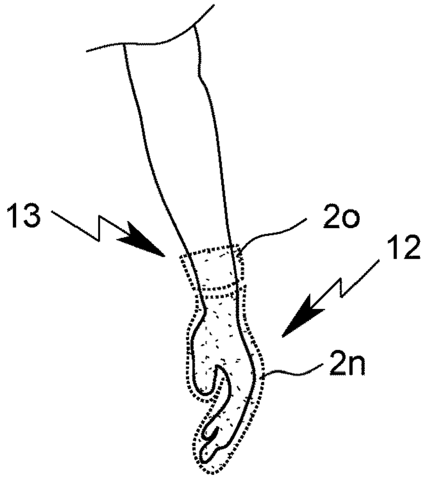
Figure 8:
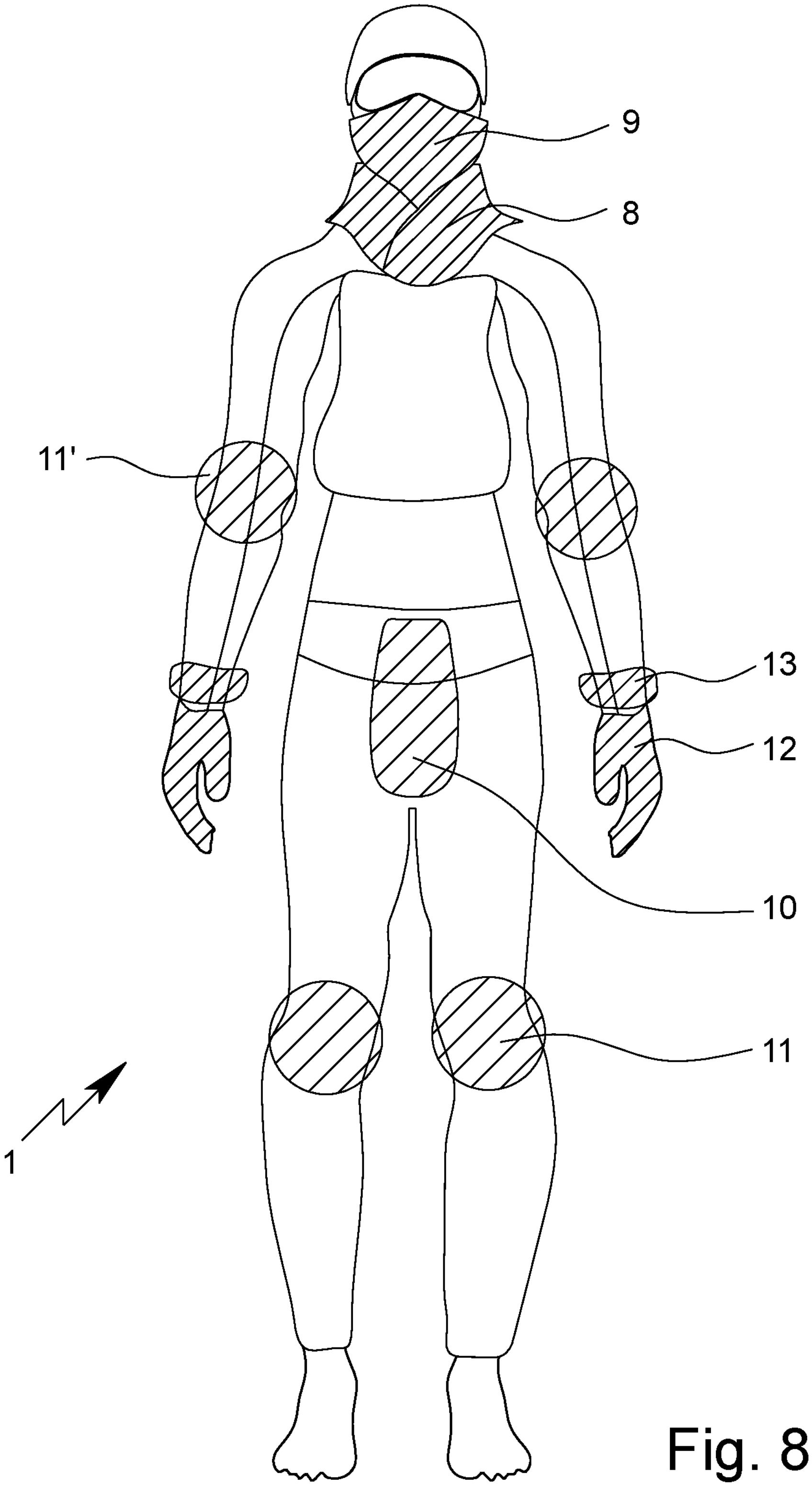
FIG. 8 shows a scheme depiction of the arrangement of complementing protective devices.

The additional fragment protection devices in question, as depicted by way of example in FIGS. 7A, 7B, 7C and 7D and also FIG. 8, may concern in particular so-called mobile units which can be carried on the person and can if necessary be put on and/or donned in addition to the further constituents of the protective apparel unit 1 of the present invention in order to ensure an appropriate superior form of fragment protection, for example when faced with the heightened risk potential of battlefield deployment or the like. The hereinafter adduced additional fragment protection devices are all in principle compact to stow and simple to carry. If necessary, the additional/complementing fragment protection devices are quick and uncomplicated to put on and take off. On this basis, therefore, the protective apparel unit 1 of the present invention may be equipped/complemented with further modular-type fragment protection devices.

Figure 3B:
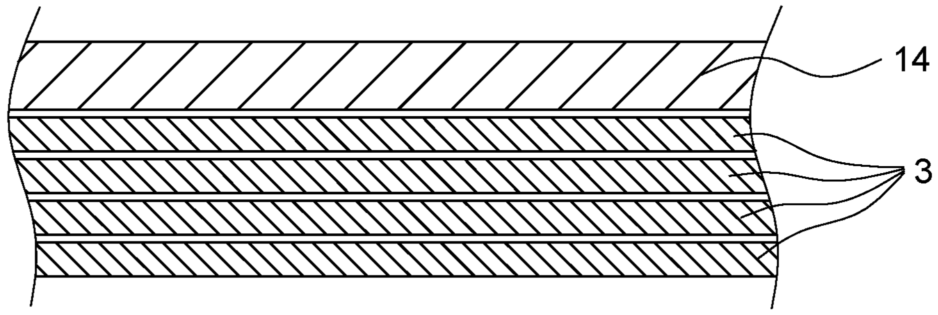

Particularly since the complementing/additional fragment protection devices are generally visible in the donned state, they may be endowed with additional textile sheet materials 14 on the wearer-remote side in particular (cf. FIG. 3A and/or FIG. 3B). Suitable for this are, for example, textile sheet materials having correspondingly flame-retardant and/or fire-resistant properties and also having antimicrobial/antibacterial properties and/or appropriate camouflage, although said materials may similarly have a high hydrophilicity to improve the removal of moisture, thereby further improving the wearing comfort.

In this context, the protective apparel unit 1 according to the invention may, for example, comprise at least one fragment protection collar 8 (collar-type fragment protection device), as depicted in FIG. 7A. In this context, the fragment protection collar 8 may in its donned state extend over and/or at least partly cover the region of the neck 1 and/or of the specifically upper shoulders k. More particularly, the fragment protection collar 8 may include or consist of at least one neck-type fragment protection element 2*l*'. In this context, the fragment protection collar may have an elongated shape for example. The fragment protection collar 8 may on this basis be slung around the neck and completely cover the neck. In this connection, the fragment protection collar 8 may similarly include at least one closing and/or fixing means. This makes it possible to provide an effective form of additional protection in relation to the throat/neck region and also the upper shoulders.

The fragment protection collar 8 in its donned state ensures a superior form of protection, for example in complementation to the above-adduced neck-type fragment protection element 2*l* of the undershirt 7 and/or of the overshirt 7'. In this context, the fragment protection collar 8 may be donned in complementation to the undershirt 7 and/or the overshirt 7'. More particularly, the fragment protection collar 8 may be donned in the manner of an additional standup collar, in which case there is a superior form of protection with regard to the carotid artery in particular. In one way to don the fragment protection collar 8, the fragment protection collar 8 is laid around the neck and crossed in the anterior throat/larynx region and closed with the corresponding fastening/fixing means. As a result, by overlapping the corresponding ends of the fragment protection collar 8, an additionally superior form of fragment protection is ensured in the anterior neck region. The fragment protection collar 8 may include further means to improve the body fit in the donned state, for example integrated elastic and/or drawstring bands in order that an individual adaptation to the wearer's neck size be made possible in this way. The fragment protection collar 8 may additionally include, particularly on that side which in the donned state faces away from the body of the wearer, at least one further textile sheet material 14, in which case the textile sheet material 14 may be endowed with, for example, flameproofing and/or camouflaging.

FIG. 7B shows a further embodiment of the present invention, wherein the protective apparel unit 1 according to the invention comprises at least one fragment protection cloth and/or at least one fragment protection tube 9 (also referred to interchangeably as cloth/tube type fragment protection device), in particular a fragment protection bandana. In this regard, the fragment protection cloth/tube 9 may in its donned state extend over and/or at least partly cover the region of the neck 1 and/or the specifically lower part of the face m. In particular, the fragment protection cloth and/or tube 9 may include and/or consist of at least one neck/face type fragment protection element 2*m*, in particular as defined above.

The fragment protection tube and/or bandana may in this context be worn, in its donned state, around the neck and/or over the chin up to over the nose as a complementing form of head protection, in which case the ears may also be covered to some extent at least. More particularly, the fragment protection cloth and/or tube 9 may in its donned state cover the face, the head region and also the throat/neck region. More particularly, the tubelike construction makes it possible to establish the degree of coverage of the aforementioned regions in a precise manner, for example according to whether the wearer is wearing a protective helmet to protect the head region r, in which case the fragment protection device 9, in particular the fragment protection bandana, can be put on such that it does not cover the upper region of the head.

In the event that the wearer does not wear any helmet and/or headguard, the fragment protection device 9, in particular the fragment protection balaclava, may also be worn such that it does cover the head.

FIG. 7C shows a further embodiment of the present invention, wherein the protective apparel unit 1 according to the invention comprises at least one fragment protection hood and/or at least one fragment protection cowl 9', specifically fragment protection balaclava, interchangeably also referred to as a fragment protection cowl hood. This fragment protection hood and/or fragment protection cowl 9' may in its donned state extend over and/or at least partly cover the region of the neck 1 and/or the specifically lower part of the face m and/or the head r. The fragment protection hood and/or the fragment protection cowl 9' may include or consist of at least one neck/face/head type fragment protection element 2*m'*.

More particular, therefore, the construction as a fragment protection balaclava may also be used to realize an appropriate degree of coverage of the (upper) region of the head, in which case the balaclava should have a (facial) opening in the region of the face and specifically in the region of the eyes q. This is a way to achieve an effective form of fragment protection even in relation to the head region.

The fragment protection cloth/tube 9 on the one hand and the fragment protection hood/cowl 9' on the other may each be worn in complementation to goggles to protect the eye region q and/or to a protective helmet to (additionally) protect the head region r and/or the neck region 1 (cf. FIG. 2 and FIG. 7B, FIG. 7C).

Similarly, the fragment protection cloth/tube 9 and/or the fragment protection hood/cowl 9' may perform a filtering function, particularly against dust or the like, provided it/they are worn over the mouth and/or the nose. Owing to the air permeability of the underlying fragment protection material being good, breathing is essentially not lastingly impaired even when the mouth is covered. Therefore, there is also a certain function as a breathing filter with regard to the removal of dust particles or the like. In addition, the fragment protection cloth/tube 9 and/or the fragment protection hood/cowl 9' may each be worn in complementation with eyewear to protect the eye region q.

Regarding the construction of the fragment protection cloth/tube 9 or the fragment protection hood/cowl 9', particularly those knitted textile fabrics 3 are employable to form the fragment protection element 2 as have mutually different (basal) areas and/or surfaces, as noted above. In addition, the use of further textile sheet materials 5 as covering material is also possible in principle.

In addition, the protective apparel unit 1 may comprise at least one genital/anal type fragment protection 10 (genital/anal type fragment protection device). The genital/anal type fragment protection 10 may in its donned state extend over and/or at least partly cover the region of the genitals b and/or of the anal and/or perineal region c, in particular the region of the genitals b. The genital/anal type fragment protection may in this context include at least one fragment protection element, particular as defined above, in particular wherein the fragment protection element in its donned state extends over and/or at least partly covers the region of the genitals b; and/or the anal and/or perineal region c, in particular the region of the genitals b. In particular, the fragment protection element may in this context take the form of a genital/anal type fragment protection element.

The genital/anal type fragment protection 10 may in general be worn particularly in complementation to the above-adduced underpant 6 in an application/deployment-specific manner, in which case the genital/anal type fragment protection 10 may in particular be worn over said underpant 6 and specifically over a (battledress suit) pant. This may be used to achieve an extension of the fragment protection function in the region of the genitals/anal region by additionally putting on and/or wearing the genital/anal type fragment protection 10. In this context, the genital/anal type fragment protection 10 may include appropriate fastening means, for example in the form of wearing/attachment and/or buckle-on bands/straps or the like. The genital/anal type fragment protection 10 can in general likewise be packed down in compact form and can therefore likewise be carried in a simple manner on the person and be put on/donned in the event of an individual threat situation. The result is thus a complementing/additional form of fragment protection with regard to the genital/anal region.

The genital/anal type fragment protection element underlying the genital/anal type fragment protection 10 may firstly be firmly integrated into the genital/anal type fragment protection. Another possibility is the employment of fragment protection elements attachable to and/or incorporable into the genital/anal type fragment protection 10, for example in connection with corresponding accommodation devices.

The present invention may further provide that the protective apparel unit 1 includes at least one knee type fragment protection 11 (knee type fragment protection device). In this context, the knee type fragment protection 11 may in its donned state extend over and/or at least partly cover the region of the knee and/or of the popliteal cavity e. In addition, the knee type fragment protection 11 may include at least one fragment protection element, in particular as defined above. To this end, the fragment protection element may in its donned state extend over and/or at least partly cover the region of the knee and/or of the popliteal cavity e. In particular, the fragment protection element may take the form of a knee type fragment protection element.

The protective apparel unit 1 of the present invention may further comprise at least one elbow type fragment protection 11'. The elbow type fragment protection 11' may in its donned state extend over and/or at least partly cover the region of the elbow j. In this context, the elbow type fragment protection 11' may additionally include at least one fragment protection element, in particular as defined above. The corresponding fragment protection element may in its donned state extend over and/or at least partly cover the region of the elbow. To this end, the fragment protection element may take the form of an elbow type fragment protection element.

The above-adduced knee type fragment protection 11 and elbow type fragment protection 11' may take the form of respectively a knee protector and of an elbow protector in the form of a mobile element which in the use and/or deployment scenario may be worn separately over the apparel.

As further depicted in FIG. 7D, the protective apparel unit 1 according to the invention may further comprise at least one hand type fragment protection 12 (hand type fragment protection device), in particular in the form of a glove. This hand type fragment protection 12 may in its donned state extend over and/or at least partly cover the region of the hand n. In addition, the hand type fragment protection 12 may include at least one fragment protection element 2*n*, in particular a hand type fragment protection element, in particular as defined above. The fragment protection element 2*n* may in its donned state extend over and/or at least partly cover the region of the hand n, in particular the back of the hand. In this context, the fragment protection element 2*n* may take the form of a hand type fragment protection element. This makes possible an additional form of fragment protection in relation to the hand, which may be provided in complementation to the other fragment protection elements in the context of the protective apparel unit 1 according to the present invention.

In addition, the protective apparel unit 1 may comprise at least one wrist type fragment protection 13 (wrist type fragment protection device). The wrist type fragment protection 13 may in its donned state extend over and/or at least partly cover the region of the wrists o. In this context, the wrist type fragment protection 13 may include at least one fragment protection element 2*o*, in particular a wrist type fragment protection element, in particular as defined above. The fragment protection element 2*o* may in its donned state extend over and/or at least partly cover the region of the wrist o, in which case the fragment protection element 2*o* may take the form of a wrist type fragment protection element. This is similarly depicted in schematic form in FIG. 7D. The wrist type fragment protection 13 thus provides a basis for providing an additional form of fragment protection in relation to the wrists and their surficial system of blood vessels.

According to the present invention, however, it may be similarly provided that the above-adduced hand type fragment protection 12 may be constructed such that it in its donned state has the corresponding fragment protection element also extending over the region of the wrists in the manner of a glove having an extended cuff.

Regarding the additional fragment protection devices 8, 9/9', 10, 11, 11', 12 and 13, moreover, FIG. 8 may be referenced.

The present invention may provide that the protective apparel unit 1, preferably the overshirt 7', the fragment protection collar 8, the fragment protection cloth and/or the fragment protection tube 9, the fragment protection hood and/or the fragment protection cowl 9', the genital/anal-type fragment protection 10, the knee-type fragment protection 11, the hand-type fragment protection 12 and/or the wrist-type fragment protection 13 may each independently include at least one covering material 14, preferably in the form of a textile sheet material. In a preferred embodiment of the present invention, the covering material 14 may in its donned state dispose on the wearer-remote side. Similarly, the covering material 14 may also be disposed on both sides.

This covering material 14 may take the form of a woven, knitted, laid or bonded textile fabric, in particular of a woven or knitted fabric. In addition, the covering material 14 may have a basis weight in the range from g/m$^2$ to 500 g/m$^2$, in particular from 75 g/m$^2$ to 300 g/m$^2$, preferably from 100 g/m$^2$ to 300 g/m$^2$. Finally, the covering material 14 may be gas permeable, in particular air permeable, and/or water vapor permeable.

This covering material 14 may include at least one material, in particular in the form of a yarn, thread and/or strand, from the group of natural products and synthetic products, preferably from the group of cotton; wool; linen; polyesters; polyolefins, polyvinyl chloride; polyvinylidene chloride; acetate; triacetate; acrylic; polyamide; polyvinyl alcohol; polyurethanes; polyvinyl esters; and also mixtures thereof.

The covering material 14 may further be fire resistant and/or flame resistant. The covering material 14 may further include at least one fire-resistant and/or flame-resistant material, in particular in the form or as a constituent part of a yarn and/or thread and/or strand, preferably filament yarn. In this context, the fire-resistant and/or flame-resistant material may be at least one aramid, in particular meta-aramid. In particular, the content of fire-resistant and/or flame-resistant material may be in the range from 1 wt % to 100 wt %, in particular from 2 wt % to 90 wt %, preferably from 5 wt % to 80 wt %, more preferably from 10 wt % to 60 wt %, based on the covering material 14. The employment of modacrylic is also possible in principle.

In this context, the covering material 14 may function as an outerwear material, in which case specific properties can be provided in this regard, like the above-adduced fire-resistant and/or flame-resistant properties. In addition, the appearance of the material may be individually styled, for example in connection with the provision of a camouflaging function. The covering material may similarly have antimicrobial, in particular antibacterial properties. In addition, to provide a high wearing comfort, the material may be hydrophilic, which improves the removal of moisture. The covering material 14 may here be bonded to the further materials/plies of the protective apparel unit 1, for example edge-sidedly, for example by stitching, welding, tacking, adhering or the like, preferably stitching.

In relation to the covering material 14, FIG. 3A and/or FIG. 3B may be referenced, because they each clarify the underlying disposition of plies on employing the covering material 14. Owing to the use of the covering material 14 as an outerwear material, the protective apparel unit 1 according to the invention is directly wearable as outerwear.

To form the protective apparel unit 1 of the present invention, it may additionally be provided that the protective apparel unit 1 is additionally equipped and/or endowed with an adsorbent for chemical poisons and/or warfare agents, in particular with a material based on activated carbon, preferably in the form of activated carbon corpuscles in granule form ("granulocarbon") or spherical form ("spherocarbon"). To this end, a specifically discontinuously, preferably punctuately applied adhesive may fix the adsorbent to the fragment protection elements 2 and/or the further textile sheet material 3 and/or the covering material 14.

The average diameter of the adsorbent particles, in particular of the activated carbon corpuscles, is preferably in the range from 0.01 to 2 mm, preferably in the range from 0.05 to 1 mm, more preferably in the range from 0.1 to 0.5 mm. The corpuscle sizes in question may be determined in particular on the basis of the method of ASTM D2862-97/04. In addition, the aforementioned quantities can be determined by methods of determination which are based on sieve analysis, on x-ray diffraction, laser diffractometry or the like. The particular methods of determination are well known as such to a person skilled in the art, so no further exposition is required in this regard.

It will further prove advantageous for the purposes of the present invention when the adsorbent particles, in particular the activated carbon corpuscles, are employed in an amount ranging from 40 to 250 g/m$^2$, in particular from 50 to 180 g/m$^2$, preferably from 55 to 130 g/m$^2$.

The activated carbon employed for the purposes of the present invention may further be generally obtainable by carbonization and subsequent activation of a synthetic and/or non-naturally based starting material, in particular based on organic polymers. In the context of the present invention, it will further be found to be particularly advantageous for the purposes of the invention to employ an activated carbon based on a very specific starting material in that, in a particularly preferred embodiment, the activated carbon employed for the purposes of the present invention is obtainable from a starting material based on organic polymers, in particular based on sulfonated organic polymers, preferably based on divinylbenzene-crosslinked polystyrene, more preferably based on styrene-divinylbenzene copolymers.

Regarding the activated carbon more preferably employed for the purposes of the present invention, obtained by carbonization and subsequent activation of the starting material based on organic polymers, the present invention may provide that the divinylbenzene content of the starting material is in the range from 1 wt % to 20 wt %, in particular from 1 wt % to 15 wt %, preferably from 1.5 wt % to 12.5 wt %, more preferably from 2 wt % to 10 wt %, based on the starting material.

The invention may further provide in this connection that the starting material is a specifically sulfonated and/or sulfo-containing ion exchange resin, in particular of the gel type.

The invention may provide in particular a polymer-based spherical activated carbon (PBSAC) is used as activated carbon. In particular, the activated carbon may be a polymer-based spherical activated carbon (PBSAC).

The activated carbon employed is in principle obtainable according to known methods of the prior art. They more particularly comprise spherical sulfonated organic polymers, in particular on the basis of divinylbenzene-crosslinked polystyrene, being for this purpose carbonized and then activated to form the particular activated carbon, in particular as noted above. Further details in this regard may be reviewed for example in the printed publications DE 43 28 219 A1, DE 43 04 026 A1, DE 196 00 237 A1 and also EP 1 918 022 A1 and/or in the same patent family's co-member equivalent U.S. Pat. No. 7,737,038 B2, the respective content of which is fully incorporated herein by reference.

Activated carbons employed in the context of the present invention are generally commercially available/obtainable. It is more particularly possible to employ activated carbons as marketed for example by Blücher GmbH, Erkrath, Germany, or by AdsorTech GmbH, Premnitz, Germany.

The parametric data recited hereinbelow with regard to the underlying activated carbon used/employed in the context of the present invention are determined by means of standardized or explicitly reported methods of determination or by using methods of determination which are per se familiar to a person skilled in the art. Especially the parametric data relating to the characterization of the porosity of the pore size distribution and other adsorptive properties are generally each obtained from the corresponding nitrogen sorption isotherm of the particular activated carbon and/or the products measured. In addition, the pore distribution, particularly also with regard to the micropore content in relation to the total pore volume, is determinable on the basis of DIN 66135-1.

It will additionally be found advantageous in the context of the present invention when the activated carbon employed for the purposes of the present invention has a more specificized total pore volume, in particular a Gurvich total pore volume, as adduced hereinbelow.

Namely, the present invention may provide that the activated carbon has a total pore volume, in particular a Gurvich total pore volume, in the range from 0.3 $cm^3/g$ to 3.8 $cm^3/g$, in particular from 0.4 $cm^3/g$ to 3.5 $cm^3/g$, preferably from 0.5 $cm^3/g$ to 3 $cm^3/g$, more preferably from 0.6 $cm^3/g$ to 2.5 $cm^3/g$, yet more preferably from 0.7 $cm^3/g$ to 2 $cm^3/g$.

The Gurvich determination of total pore volume is a method of measurement/determination which is well known per se to a person skilled in the art. For further details regarding the Gurvich determination of total pore volume, reference may be made for example to L. Gurvich (1915), *J. Phys. Chem. Soc. Russ.* 47, 805, and also S. Lowell et al., Characterization of Porous Solids and Powders: Surface Area Pore Size and Density, Kluwer Academic Publishers, *Article Technology Series, pages* 111 ff. More particularly, the pore volume of activated carbon may be determined on the basis of the Gurvich rule as per the formula $V_P = W_a/\rho_l$ where $W_a$ is the adsorbed quantity of an underlying adsorbate and $\rho_l$ is the density of the adsorbate employed (cf. also formula (8.20) as per page 111, chapter 8.4) of S. Lowell et al.).

The present invention may provide in particular that at least 65%, in particular at least 70%, preferably at least 75%, more preferably at least 80% of the total pore volume, in particular of the Gurvich total pore volume, of the activated carbon is formed by pores having pore diameters of at most 50 nm, in particular by micro- and/or mesopores.

The present invention may similarly provide in particular that 50% to 95%, in particular 60% to 90%, preferably 70% to 85% of the total pore volume, in particular of the Gurvich total pore volume, of the activated carbon is formed by pores having pore diameters of at most 50 nm, in particular by micro- and/or mesopores.

The present invention may provide in particular that 1% to 60%, in particular 5% to 50%, preferably 10% to 40%, more preferably 15% to 35% of the total pore volume, in particular of the Gurvich total pore volume, of the activated carbon is formed by pores having pore diameters of more than 2 nm, in particular by meso- and/or macropores.

More particularly, the activated carbon may have a pore volume, in particular a carbon black micropore volume, formed by pores having pore diameters of at most 2 nm (i.e., ≤2 nm), in the range from 0.05 $cm^3/g$ to 2.5 $cm^3/g$, in particular from 0.15 $cm^3/g$ to 2 $cm^3/g$, preferably 0.3 $cm^3/g$ to 1.5 $cm^3/g$, in particular wherein 15% to 98%, in particular 25% to 95%, preferably 35% to 90% of the total pore volume of the activated carbon is formed by pores having pore diameters of at most 2 nm, in particular by micropores.

The carbon black method of determination is known per se to a person skilled in the art; moreover, for further details of the carbon black method of determining the pore surface area and the pore volume, reference may be made for example to R. W. Magee, *Evaluation of the External Surface Area of Carbon Black by Nitrogen Adsorption, Presented at the Meeting of the Rubber Division of the American Chem. Soc.*, October 1994, as cited in, for example: *Quantachrome Instruments, AUTOSORB*-1, *AS*1 *WinVersion* 1.50, *Operating Manual, OM,* 05061, *Quantachrome Instruments* 2004, Florida, USA, pages 71 ff. More particularly, a t-plot method may be used to analyze the data in this regard.

In addition, the activated carbon may have a specific BET surface area in the range from 600 $m^2/g$ to 4000 $m^2/g$, in particular from 800 $m^2/g$ to 3500 $m^2/g$, preferably from 1000 $m^2/g$ to 3000 $m^2/g$, more preferably from 1200 $m^2/g$ to 2750 $m^2/g$, most preferably from 1300 $m^2/g$ to 2500 $m^2/g$.

Determining the specific surface area as per BET is in principle known per se to a person skilled in the art, so no further details need be provided in this regard. All BET surface areas reported/specified relate to the determination as per ASTM D6556-04. In the context of the present invention, the so-called Multi-Point BET method of determination (MP-BET) in a partial pressure range $p/p_0$ from 0.05 to 0.1 is used to determine the BET surface area in general and unless hereinbelow expressly stated otherwise.

In respect of further details regarding determination of BET surface area and regarding the BET method, reference can be made to the aforementioned ASTM D6556-04 and also to Römpp Chemielexikon, 10th edition, Georg Thieme Verlag, Stuttgart/New York, headword: "BET-Methode", including the references cited there, and to Winnacker-Küchler (3rd edition), volume 7, pages 93 ff. and also to Z. Anal. Chem. 238, pages 187 to 193 (1968).

In the context of the present invention, the term "micropores" refers to pores having pore diameters of less than 2 nm, whereas the term "mesopores" refers to pores having pore diameters in the range from 2 nm (i.e., 2 nm inclusive) up to 50 nm inclusive, and the term "macropores" refers to pores having pore diameters of more than 50 nm (i.e., >50 nm).

In particular, the activated carbon may have a surface area formed by pores having pore diameters of at most 2 nm, in particular by micropores, in the range from 400 to 3500 $m^2/g$, in particular from 500 to 3000 $m^2/g$, preferably from 600 to 2500 $m^2/g$, more preferably from 700 to 2000 $m^2/g$.

In particular, the activated carbon may have a surface area formed by pores having pore diameters in the range from 2 nm to 50 nm, in particular by mesopores, in the range from 200 to 2000 $m^2/g$, in particular from 300 to 1900 $m^2/g$, preferably from 400 to 1800 $m^2/g$, more preferably from 500 to 1700 $m^2/g$.

In particular, the activated carbon may have an average pore diameter in the range from 0.1 nm to 55 nm, in particular from 0.2 nm to 50 nm, preferably from 0.5 nm to 45 nm, more preferably from 1 nm to 40 nm.

By virtue of the purpose-directed employment of an adsorptive material in the form of activated carbon in particular, the protective apparel unit 1 of the present invention may, in addition to the fragment protection provided according to the present invention, be provided with adsorptive properties, in particular with regard to the adsorption of biological and/or chemical poison and/or warfare agent molecules, thereby providing altogether a protective apparel unit 1 offering multiple protection (fragment protection and protection against poison and/or warfare agent molecules).

The present invention additionally provides—in a further aspect of the present invention—for the use of a multiplicity of fragment protection elements, in particular as defined above, to form and/or provide a complementary and/or mutually complementing and/or individually adaptable protective function against fragments caused and/or released by detonation and/or explosion. Therein the fragment protection elements in their donned state each extend over and/or at least partly cover various bodily regions and/or portions of the wearer and/or bodily regions and/or portions of the wearer assigned to the particular fragment protection elements and/or bodily regions and/or portions of the wearer assigned to the particular fragment protection elements.

The concept of the present invention is thus the basis for employing specific fragment protection elements, arranged specifically in relation to defined areas and/or regions of the body, to provide a form of fragment protection that is adjustable/adaptable not only with regard to the wearer but also with regard to the particular underlying threat potential. This individual adaptability of the fragment protection function rests chiefly on the provision/use of body area specific fragment protection elements and their precise combination in that in relation to specific regions of the body, in particular those at high risk of injury and/or of high physiological relevance, even a multifold/multiple form of protection is provided, for example by employing additional fragment protection elements or a plurality of plies of the knitted textile fabric employed for the fragment protection elements.

The altogether high-performance fragment protection elements also employed in the context of the use provided by the present invention under the present aspect are based in particular on a specific knitted textile fabric, the materials employed/used in this connection utilizing at least one ultra high molecular weight polyethylene as defined above.

Under this aspect, moreover, the present invention further provides the method of using a multiplicity of fragment protection elements, in particular as defined above, to form and/or provide a protective apparel unit in particular a complementary and/or mutually complementing and/or individually adaptable protective function against fragments caused and/or released by detonation and/or explosion, wherein the fragment protection elements in their donned state each extend over and/or at least partly cover various bodily regions and/or portions of the wearer and/or bodily regions and/or portions of the wearer assigned to the particular fragment protection elements.

The present invention finally further provides—in a further aspect of the present invention—the method of using at least one fragment protection element in the form of a thigh-type fragment protection element, of an elbow-type fragment protection element, of a shoulder-type fragment protection element, of a genital-type fragment protection element and/or at least one fragment protection device in the form of a fragment protection collar, of a fragment protection cloth and/or of a fragment protection tube, of a fragment protection hood and/or of a fragment protection cowl, of a genital/anal-type fragment protection, of a knee-type fragment protection, of an elbow-type fragment protection, of a hand-type fragment protection and/or of a wrist-type fragment protection, in particular each as defined above, for body part specific and/or body portion specific enhancement of the protective function against fragments caused and/or released by detonation and/or explosion and/or to form and/or provide a protective apparel unit in particular having complementary and/or mutually complementing and/or individually adaptable protective function against fragments caused and/or released by detonation and/or explosion, wherein the fragment protection elements and/or fragment protection devices in their donned state each extend over and/or at least partly cover various bodily regions and/or portions of the wearer and/or bodily regions and/or portions of the wearer assigned to the particular fragment protection elements and/or fragment protection devices.

Further versions, alterations, variations, modifications, special features and advantages of the present invention will be readily apparent to and realizable by the ordinarily skilled on reading the description without their having to go outside the realm of the present invention.

The present invention is illustrated by the following exemplary embodiments which, however, shall in no way limit the present invention.

Exemplary Embodiments

1. Tests of Ballistic-Protective Function and/or Stopping Power of Various Fragment Protection Elements The ballistic-protective function and/or the ballistic stopping power of the fragment protection elements tested in the present test complex is determined by means of the ballistic protection values $V_{50}$ measured according to STANAG 2920 (RCC 0.13 g, where RCC=right circular cylinder). Higher $V_{50}$ values denote a superior ballistic-protective function and/or stopping power on the part of the fragment protection elements tested.

The fragment protection elements in question are each present for the test as a knitted textile fabric, the material of which in the case of the fragment protection elements deployed according to the invention is based on ultra high molecular weight polyethylene (UHMW-PE) and in the case of the comparative fragment protection elements is based on para-aramid. The yarns employed in this regard have a linear density of about 220 dtex for all the fragment protection elements tested. The knitted textile fabrics underlying the fragment protection elements further each have a basis weight of about 290 $g/m^2$ (per ply of the knitted textile fabric).

The following tests are carried out in this context:

a) In a first complex of tests, the $V_{50}$ values of fragment protection elements based on UHMW-PE on the one hand and para-aramid on the other are determined as a function of the number of plies of the knitted textile fabric used for the particular fragment protection elements.

b) In a second complex of tests, two-ply fragment protection elements based on UHMW-PE on the one hand and para-aramid on the other are subjected to a determination of the corresponding $V_{50}$ values following UV irradiation of the particular fragment protection elements (following an irradiation period of one week).

c) In a further complex of tests, moreover, the corresponding $V_{50}$ values of two-ply fragment protection elements based on UHMW-PE on the one hand and para-aramid on the other are determined after having been subjected to washing cycles at 60° C. in a conventional domestic washing machine and by employing a conventional laundry detergent.

d) In a further complex of tests, finally, the corresponding $V_{50}$ values of two-ply fragment protection elements based on UHMW-PE on the one hand and para-aramid on the other are determined following a heat treatment at a temperature of 70° C. (treatment period=24 h).

The following table illustrates the results obtained in tests a) to d):

| Test | Number of plies | $V_{50}$ MHWE-PE | $V_{50}$ para-Aramid |
|---|---|---|---|
| a) number of plies | 1 | >320 m/s | >170 m/s |
| | 2 | >400 m/s | >210 m/s |
| | 5 | >520 m/s | >390 m/s |
| b) UV irradiation | 2 | >380 m/s | >120 m/s |
| c) wash treatment | 2 | >390 m/s | >140 m/s |
| d) heat treatment | 2 | >395 m/s | >200 m/s |

The table shows that the UHMW-PE-based fragment protection elements used according to the present invention achieve altogether significantly higher $V_{50}$ values as compared with the materials tested on the basis of para-aramid. The table further shows that the UHMW-PE-based fragment protection elements used according to the present invention have significantly better ballistic-protective properties than materials based on para-aramid even after a corresponding treatment (UV irradiation, wash treatment and also heat treatment). The UHMW-PE-based materials, moreover, versus the untreated materials exhibit but very low changes in the $V_{50}$ values, which illustrates the stability of the materials.

The tests in conclusion show the improved properties of fragment protection elements based on UHMW-PE. The tests show in particular that the UHMW-PE-based material underlying the fragment protection elements is UV-stable, moisture-resistant and additionally also thermally stable, so the ballistic-protective function of such materials is not lastingly degraded even under extreme conditions.

The results thus altogether demonstrate the distinctly superior properties of UHMW-PE-based fragment protection elements employed according to the present invention versus systems based on para-aramid.

2. Influence of Structural Elements on Ballistic-Protective Function and/or Stopping Power of Fragment Protection Elements In a further portion of tests, the influence of structural elements in the knitted textile material used to form the fragment protection elements employed according to the present invention is tested using single-ply materials based on UHMW-PE, the structural elements being present therein in the form e) floats and alternatively f) tuck loops. To determine the ballistic-protective function, the corresponding ballistic protection values $V_{50}$ are measured/determined to STANAG 2920 (RCC 0.13 g).

The following table shows the results obtained:

| Test | Number of plies | $V_{50}$ |
|---|---|---|
| e) structural element = floats | 1 | >380 m/s |
| f) structural element = tuck loops | 1 | >350 m/s |

The above results illustrate that the use of specific knitted textile fabrics to form the fragment protection elements with the additional use of floats or tuck loops as structural elements leads to a significant increase in the ballistic-protective properties as indicated by correspondingly increased $V_{50}$ values. Particularly good results are obtained when the structural elements are in the form of floats.

3. Clothing Physiology of Fragment Protection Elements Based on UHMW-PE:

A further test of (one-ply) UHMW-PE-based fragment protection elements used according to the present invention confirms that the fragment protection elements employed according to the present invention do altogether also have outstanding properties with regard to clothing physiology. Thus, the DIN EN ISO 9237 air transmission rate of the knitted textile fabric and/or of the fragment protection element resulting therefrom is more than 300 cfm. In addition, a TEGEWA test shows the material to score a hydrophilicity rating of 5, which indicates that the material is capable of taking up perspiration/moisture throughout even a long period of wear without feeling moist. The reported value further illuminates that the material is effective in removing moisture/perspiration from the wearer. The material tested further has an Ret value as per DIN EN 31092 of about 4.39 $m^2 \cdot Pa/W$. In addition, the material is antimicrobial/biostatic as per ASTM E-2149-10 and perspiration-fast as per DIN EN ISO 105-E04. The material is further also notable for the fact that it is at least essentially inert toward ammonia and/or urine. The material additionally evinces very good launderability. Thus, there are no significant changes in the material-related properties to be observed even after 20 washing cycles in a domestic washing machine at a washing temperature of 60° C. The material is further notable for a very short drying time in that complete drying from 100% moisture saturation is observed to take place over hours. The UHMW-PE-based material underlying the fragment protection elements is further ECO-TEX certified and may in this regard be assigned to product class II, which relates to products involving direct contact with the skin.

In contradistinction to ballistic-protective packets of the prior art, which are welded into water-impervious foils, as a result of which their use/donning will result in a considerable evolution of heat and also in sweating and running sweat, the UHMW-PE-based fragment protection elements used according to the present invention, even in a multi-ply construction, will augment the physiological properties and hence the wearing comfort—particularly also by virtue of the air permeability and hydrophilicity of the materials used according to the present invention.

The use of UHMW-PE-based materials leads to a significant delay and/or reduction in any temperature increase experienced by the wearer, while moreover resultant perspiration can be taken up by the material. This in general prevents any heat build-up, in particular since the material used according to the present invention has cool haptics.

4. Flammability Test of Fragment Protection Element Used According to the Invention In a first series of tests, a UHMW-PE-based fragment protection element used according to the present invention after covering with a textile covering layer based on a fire-resistant material, is subjected to a flammability test to DIN EN ISO 15025: 2002. The underlying plied construction, made up of fragment protection on the one hand and covering material on the other, is found to have a high resistance to heat/flames even after seconds of direct flaming. The UHMW-PE material merely exhibits slight surficial discoloration. The material does not melt, drip, form holes or burn.

In a second series of tests, a single-ply fragment protection element is investigated for flame resistance using in this regard a knitted textile fabric displaying predominantly a UHMW-PE-based yarn system on one side and/or a (major) area, while the (major) area opposite this side employs a yarn and/or a fiber species based on meta-aramid. The material in question may have been produced in particular on a circular weft-knitting machine with independently-movable needles. Before being subjected to flaming as per the above-adduced standard, the underlying material has a $V_{50}$ value of about 290 m/s. After the predominantly meta-aramid (major) area of the material has been subjected to flaming a $V_{50}$ of 275 m/s can be determined. Therefore, the material combines good resistance to flaming with high performance in ballistic-protective function.

The tests adduced altogether demonstrate that the use of specific fragment protection elements comprising a knitted textile fabric containing and/or formed of an ultra high molecular weight polyethylene in the manner of the present invention is a basis for particularly good ballistic-protective properties resulting in the protective apparel unit manufactured therewith, while the materials used are also highly stable in this regard.

LIST OF REFERENCE NUMERALS

1 protective apparel unit
2 fragment protection element
2*a* thigh-type fragment protection element
2*a*' releasable thigh-type fragment protection element
2*b* genital-type fragment protection element
2*b*' releasable genital-type fragment protection element
2*c* anal/perineal-type fragment protection element
2*d* leg-type fragment protection element
2*e* releasable knee-type fragment protection element
2*f* urinary bladder tract type fragment protection element (underpant)
2*f*' urinary bladder tract type fragment protection element (under- and/or overshirt)
2*g* renal pelvis-type fragment protection element (underpant)
2*g*' renal pelvis-type fragment protection element (under- and/or overshirt)
2*h* torso-type fragment protection element
2*i* arm-type fragment protection element
2*j* releasable elbow-type fragment protection element
2*k* releasable shoulder-type fragment protection element
2*l* neck-type fragment protection element
2*l*' fragment protection element (fragment protection collar)
2*m* neck/face-type fragment protection element
2*m*' neck/face/head-type fragment protection element
2*n* hand-type fragment protection element
2*o* wrist-type fragment protection element
3 knitted textile fabric
3*a* knitted stitch
3*b* structural element
4 accommodation device
4*a* thigh protection accommodation protection device
4*b* genital protection accommodation device
4*c* elbow protection accommodation device
4*d* shoulder protection accommodation device
4*e* knee protection accommodation device
5 further textile sheet material
6 underpant
7 undershirt
7' overshirt
8 fragment protection collar
9 fragment protection cloth and/or tube
9' fragment protection hood and/or cowl
10 genital/anal-type fragment protection
11 knee-type fragment protection
11' elbow-type fragment protection
12 hand-type fragment protection
13 wrist-type fragment protection
14 covering material
a region of thigh
a' region of loin
b region of genitals
c anal and/or perineal region
d region of lower leg
e region of knee and/or popliteal cavity
f region of lower abdomen and/or bladder and urinary tract
g region of lower back and/or renal pelvis
h region of torso
i region of upper and/or lower arm
j region of chelidon and/or cubitus
k region of shoulder
l region of neck
m region of specifically lower part of the face
n region of hand
region of wrist
p region of chest cage
q region of eye
r region of head

What is claimed is:

1. A fragment-protective apparel unit having a protective function against fragments caused or released by detonation or explosion, the fragment-protective apparel unit comprising at least one of outerwear and underwear and, optionally, also one of separate head protection, face protection, neck protection, shoulder protection, arm protection, hand protection, trunk protection, torso protection, genital protection, anal protection and leg protection;

wherein the protective apparel unit includes different textile fragment protection elements, which textile fragment protection elements have a protective function against fragments caused or released by detonation or explosion and, in the state of use, are assigned to or cover different body regions, and wherein the fragment protection elements each, independently from each other, include or consist of at least one ultra-high molecular weight polyethylene (UHMW-PE) and are each, independently from each other, configured as a knitted textile fabric, wherein the knitted textile fabric has a basis weight in the range from 125 $g/m^2$ to 500 $g/m^2$, wherein the knitted textile fabric includes a multiplicity of needle loops and a multiplicity of at least one other structural element different from needle loops, wherein the at least one other structural element is a tuck loop or a float;

wherein the ultra-high molecular weight polyethylene (UHMW-PE) is present as a filament yarn to form or as constituent part of the knitted textile fabric of the fragment protection elements;

wherein the filament yarn has a linear density in the range of from 50 to 500 dtex, a tenacity in the range of from 2 N/tex to 8 N/tex, and a breaking extension in the range of from 0.5% to 10%;

wherein the filament yarn consists of at least four and up to 800 individual filaments, and wherein the filament yarn has a diameter in the range from 4 μm to 250 μm, and wherein the fragment protection elements each, independently from each other, have a fragment or ballistic protection value V50, determined as per the method of STANAG 2920, of at least 180 m/s.

2. The protective apparel unit as claimed in claim 1, wherein the fragment protection elements each, independently from each other, include at least one knitted textile fabric in the form of a formed-loop knit, a warp-knitted fabric or a weft-knitted fabric;

wherein the fragment protection elements each, independently from each other, have a fragment or ballistic protection value V50, determined as per the method of STANAG 2920, of at least 200 m/S.

3. The protective apparel unit as claimed in claim 1, wherein the fragment protection elements each, independently form each other, have a fragment or ballistic protection value V50, determined as per the method of STANAG 2920, in the range of from 200 m/s to 800 m/s.

4. The protective apparel unit as claimed in claim 1, wherein the filament yarn has a density in the range of from 800 $kg/m^3$ to 1200 kg/m3.

5. The protective apparel unit as claimed in claim 1, wherein the knitted textile fabric is further provided with at least one further material other than ultra high molecular weight polyethylene (UHMW-PE).

6. The protective apparel unit as claimed in claim 5, wherein the further material other than ultra high molecular weight polyethylene (UHMW-PE) is in the form of a yarn, filament yarn, thread or strand; and wherein the further material other than ultra high molecular weight polyethylene (UHMW-PE) provides at least one of antimicrobial, biostatic, elastic, hydrophilic, fire-resistant and flame-resistant properties.

7. The protective apparel unit as claimed in claim 1, wherein the knitted textile fabric is in the form of a two-dimensional textile sheet material and wherein the knitted textile fabric is air-permeable and has an air transmission rate, determined according to DIN ISO 9237, of at least 10001/m2·min; and wherein the knitted textile fabric is water-vapor permeable and has a water vapor transmission rate at 20° C. of at least 201/m2 per 24 h; and wherein the knitted textile fabric has a thickness in the range of from 0.05 mm to 50 mm.

8. The protective apparel unit as claimed in claim 1, wherein the knitted textile fabric has rib-shaped elevations on the area facing the wearer in the state of use.

9. The protective apparel unit as claimed in claim 1, wherein the protective apparel unit further includes at least one further textile sheet material, wherein the further textile sheet material combines with the fragment protection elements to form a single plied or single-layered area of the protective apparel unit, and wherein the further textile sheet material is bonded or attached to the fragment protection elements.

10. The protective apparel unit as claimed in claim 1, wherein the protective apparel unit comprises an undershirt or an overshirt, wherein the undershirt or overshirt, in the state of use, extends at least partly over the region of the upper extremities or of the torso or of the neck/shoulder region or at least partly covers the upper extremities or the torso or the neck/shoulder region, or wherein the undershirt or overshirt, in the state of use, extends at least partly over or at least partly covers the region of the lower abdomen or of the urinary bladder tract, of the lower back or of the renal pelvis, of the torso, of the lateral or posterior torso, of the upper or lower arm, of the cheliton or of the cubitus, of the shoulder or of the neck.

11. The protective apparel unit as claimed in claim 1, wherein the protective apparel unit comprises at least one covering material.

12. The protective apparel unit as claimed in claim 11, wherein the covering material is in the form of a textile sheet material; and wherein the covering material is at least one of fire-resistant and flame-resistant.

13. The protective apparel unit as claimed in claim 1, wherein the protective apparel unit is additionally equipped or provided with at least one adsorbent for chemical poisons or warfare agents.

14. A fragment-protective apparel unit having a protective function against fragments caused or released by detonation or explosion, the fragment-protective apparel unit comprising at least one of outerwear and underwear and, optionally, also one of separate head protection, face protection, neck protection, shoulder protection, arm protection, hand protection, trunk protection, torso protection, genital protection, anal protection and leg protection;

wherein the protective apparel unit includes different textile fragment protection elements, which textile fragment protection elements have a protective function against fragments caused or released by detonation or explosion and, in the state of use, are assigned to or cover different body regions, and wherein the fragment protection elements each, independently from each other, include or consist of at least one ultra-high molecular weight polyethylene (UHMW-PE) and are each, independently from each other, configured as a knitted textile fabric, wherein the knitted textile fabric has a basis weight in the range from 125 $g/m^2$ to 500 $g/m^2$, wherein the knitted textile fabric includes a multiplicity of needle loops and a multiplicity of at least one other structural element different from needle loops, wherein the at least one other structural element is a tuck loop or a float;

wherein the ultra high molecular weight polyethylene (UHMW-PE) is present as a filament yarn to form or as constituent part of the knitted textile fabric of the fragment protection elements;

wherein the filament yarn has a linear density in the range of from 50 to 500 dtex, a tenacity in the range of from 2 N/tex to 8 N/tex, and a breaking extension in the range of from 0.5% to 10%;

wherein the filament yarn consists of at least four and up to 800 individual filaments, and wherein the filament yarn has a diameter in the range from 4 μm to 250 μm, wherein the fragment protection elements each, independently from each other, have a fragment or ballistic protection value V50, determined as per the method of STANAG 2920, of at least 180 m/s; and wherein the fragment-protective apparel unit includes at least one further textile sheet material, wherein the further textile sheet material combines with the fragment protection elements to form a single-plied or single layered area of the protective apparel unit, wherein the further textile sheet material is bonded or attached to the fragment protection elements, wherein the further textile sheet material is elastic, and wherein the further textile sheet material includes at least one elastic yarn or fiber or at least one elastic thread or strand.

15. A fragment-protective apparel unit having a protective function against fragments caused or released by detonation or explosion, the fragment-protective apparel unit comprising at least one of outerwear and underwear and, optionally, also one of separate head protection, face protection, neck protection, shoulder protection, arm protection, hand protection, trunk protection, torso protection, genital protection, anal protection and leg protection;

wherein the protective apparel unit includes different textile fragment protection elements, which textile fragment protection elements have a protective function against fragments caused or released by detonation or explosion and, in the state of use, are assigned to or cover different body regions, and wherein the fragment protection elements each, independently from each other, include or consist of at least one ultra-high molecular weight polyethylene (UHMW-PE) and are each, independently from each other, configured as a knitted textile fabric, wherein the fragment protection elements each, independently from each other, include or consist of at least one ultra-high molecular weight polyethylene (UHMW-PE) and are each, independently from each other, configured as a knitted textile fabric, wherein the knitted textile fabric includes a multiplicity of needle loops and a multiplicity of at least one other structural element different from needle loops, wherein the at least one other structural element is selected from the group consisting of tuck loop, float, inlay, partial insertion and filler thread;

wherein the ultrahigh molecular weight polyethylene (UHMW-PE) is present as a filament yarn to form or as a constituent part of the knitted fabric of the fragment protection elements, wherein the filament yarn has a diameter in the range from 4 μm to 250 μm, and wherein the fragment protection elements each, independently from each other, have a fragment or ballistic protection value V50, determined as per the method of STANAG 2920, of at least 180 m/S.

16. A fragment-protective apparel unit having a protective function against fragments caused or released by detonation or explosion, the fragment-protective apparel unit comprising at least one of outerwear and underwear and, optionally, also one of separate head protection, face protection, neck protection, shoulder protection, arm protection, hand protection, trunk protection, torso protection, genital protection, anal protection and leg protection;

wherein the protective apparel unit includes different textile fragment protection elements, which textile fragment protection elements have a protective function against fragments caused or released by detonation or explosion and, in the state of use, are assigned to or cover different body regions, and wherein the fragment protection elements each, independently from each other, include or consist of at least one ultra-high molecular weight polyethylene (UHMW-PE) and are each, independently from each other, configured as a knitted textile fabric, wherein the knitted textile fabric has a basis weight in the range from 125 $g/m^2$ to 500 $g/m^2$, wherein the knitted textile fabric includes a multiplicity of needle loops and a multiplicity of at least one other structural element different from needle loops, wherein the at least one other structural element is a tuck loop or a float;

wherein the ultra-high molecular weight polyethylene (UHMW-PE) is present as a filament yarn to form or as constituent part of the knitted textile fabric of the fragment protection elements;

wherein the filament yarn has a breaking extension in the range of from 0.5% to 10%;

wherein the filament yarn consists of at least four and up to 800 individual filaments, and wherein the filament yarn has a diameter in the range from 4 μm to 250 μm;

wherein the fragment protection elements each, independently from each other, have a fragment or ballistic protection value V50, determined as per the method of STANAG 2920, of at least 180 m/s.

* * * * *